US007003865B1

(12) United States Patent
Blevio, Sr.

(10) Patent No.: US 7,003,865 B1
(45) Date of Patent: Feb. 28, 2006

(54) MACHINE FOR TRIMMING DOORS AND/OR DRAWER FRONTS FOR CABINETS AND METHOD

(76) Inventor: Henry L. Blevio, Sr., 9 Oak Point Club, New Milford, CT (US) 06776

(*) Notice: Subject to any disclaimer, the term of this patent is extended or adjusted under 35 U.S.C. 154(b) by 214 days.

(21) Appl. No.: 10/769,648

(22) Filed: Feb. 2, 2004

(51) Int. Cl.
*B23P 23/00* (2006.01)

(52) U.S. Cl. ......................... 29/561; 29/564.1; 29/563; 144/329

(58) Field of Classification Search .................. 29/561, 29/563, 564, 564.1, 787, 798, 897.312, 426.5, 29/426.3; 254/18; 144/329, 359, 1.1, 1.2, 144/1.3; 227/152; 118/500; 269/905
See application file for complete search history.

(56) References Cited

U.S. PATENT DOCUMENTS 4,353,399 A * 10/1982 Harris ........................ 144/2.1
4,392,599 A * 7/1983 Russell ....................... 227/152
4,876,787 A * 10/1989 Ditty et al. .................... 29/430
5,095,605 A * 3/1992 Tonus .......................... 29/432
5,191,706 A * 3/1993 Cosden ........................ 29/787
5,253,844 A * 10/1993 Cotic et al. ................... 254/18
5,568,954 A * 10/1996 Burgess ...................... 118/500
5,725,205 A * 3/1998 O'Berg ....................... 269/905
6,090,204 A * 7/2000 Speed et al. ................ 118/500
6,164,512 A * 12/2000 Raffoni ....................... 227/152
6,293,007 B1 * 9/2001 Kuriyama et al. ......... 29/564.1
6,481,691 B1 * 11/2002 Irving ......................... 254/18
6,755,392 B1 * 6/2004 Phillips ....................... 254/18
6,764,434 B1 * 7/2004 Volk .......................... 144/48.1

* cited by examiner

*Primary Examiner*—Boyer D. Ashley
*Assistant Examiner*—Dana Ross
(74) *Attorney, Agent, or Firm*—John H. Crozier

(57) ABSTRACT

In a preferred embodiment, a machine for milling doors and/or drawer fronts, including: apparatus to horizontally clamp a door or drawer front to a horizontal movable table; apparatus to remove vertically disposed scribe pins from the door and/or drawer front, backs of the vertically disposed scribe pins defining a position of a frame to be spaced from the door and/or drawer front by a reveal; points disposed at the lower end of the vertically disposed scribe pins, flush with the backs, the points inserted into the door or drawer front; and apparatus to move the movable table such as to move the door or drawer front past a cutter head, the cutter head cutting the door or drawer front at least from a line in which lie the backs to a finished edge of the door or drawer front. A method of using the milling machine is also provided.

10 Claims, 32 Drawing Sheets

MACHINE FOR TRIMMING DOORS AND/OR DRAWER FRONTS FOR CABINETS AND METHOD

BACKGROUND OF THE INVENTION

1. Field of the Invention

The present invention relates to doors and drawer fronts for cabinets generally and, more particularly, but not by way of limitation, to a novel machine for trimming such doors and drawer fronts and a method of trimming the same.

2. Background Art

Doors and drawer fronts are well known and widely used. In the case of flush, or inset, doors and drawer fronts (when the latter is used), it is desirable to have a uniform space around each side of the door and the drawer front. This reveal is typically one-eighth of an inch wide. It is relatively easy to assemble such doors and drawer fronts when they are of stock sizes—one merely assembles precut panels and, assuming the precut panels have been properly cut, the resulting space around the door and the drawer front is uniform and no measuring is required.

When a custom cabinet is constructed, on the other hand, fitting the door and the drawer front can be somewhat difficult. The openings for the door and the drawer front must be measured by hand and then the door and the drawer front trimmed by use of a router and/or a drum sander, for example. This requires a certain degree of skill and cannot be simply used on a production line by a relatively unskilled laborer.

Accordingly, it is a principal object of the present invention to provide a trimming machine and method that produce a uniform spacing around an inset door and a drawer front of a cabinet.

A further object of the invention is to provide such a trimming machine and method that can be used by a relatively unskilled laborer on a production line.

Another object of the invention is to provide such a trimming machine and method that requires no manual measurement.

An additional object of the invention is to provide such a trimming machine that can be economically constructed using conventional techniques.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a machine for milling doors and/or drawer fronts, comprising: means to horizontally clamp a door or drawer front to a horizontal movable table; means to remove vertically disposed scribe pins from said door and/or drawer front, backs of said vertically disposed scribe pins defining a position of a frame to be spaced from said door and/or drawer front by a reveal; points disposed at the lower end of said vertically disposed scribe pins, flush with said backs, said points inserted into said door or drawer front; and means to move said movable table such as to move said door or drawer front past a cutter head, said cutter head cutting said door or drawer front at least from a line in which lie said backs to a finished edge of said door or drawer front. A method of using said milling machine is also provided.

BRIEF DESCRIPTION OF THE DRAWING

Understanding of the present invention and the various aspects thereof will be facilitated by reference to the accompanying drawing figures, provided for purposes of illustration only and not intended to define the scope of the invention, on which.

DETAILED DESCRIPTION OF THE PREFERRED EMBODIMENTS

Figure 1:
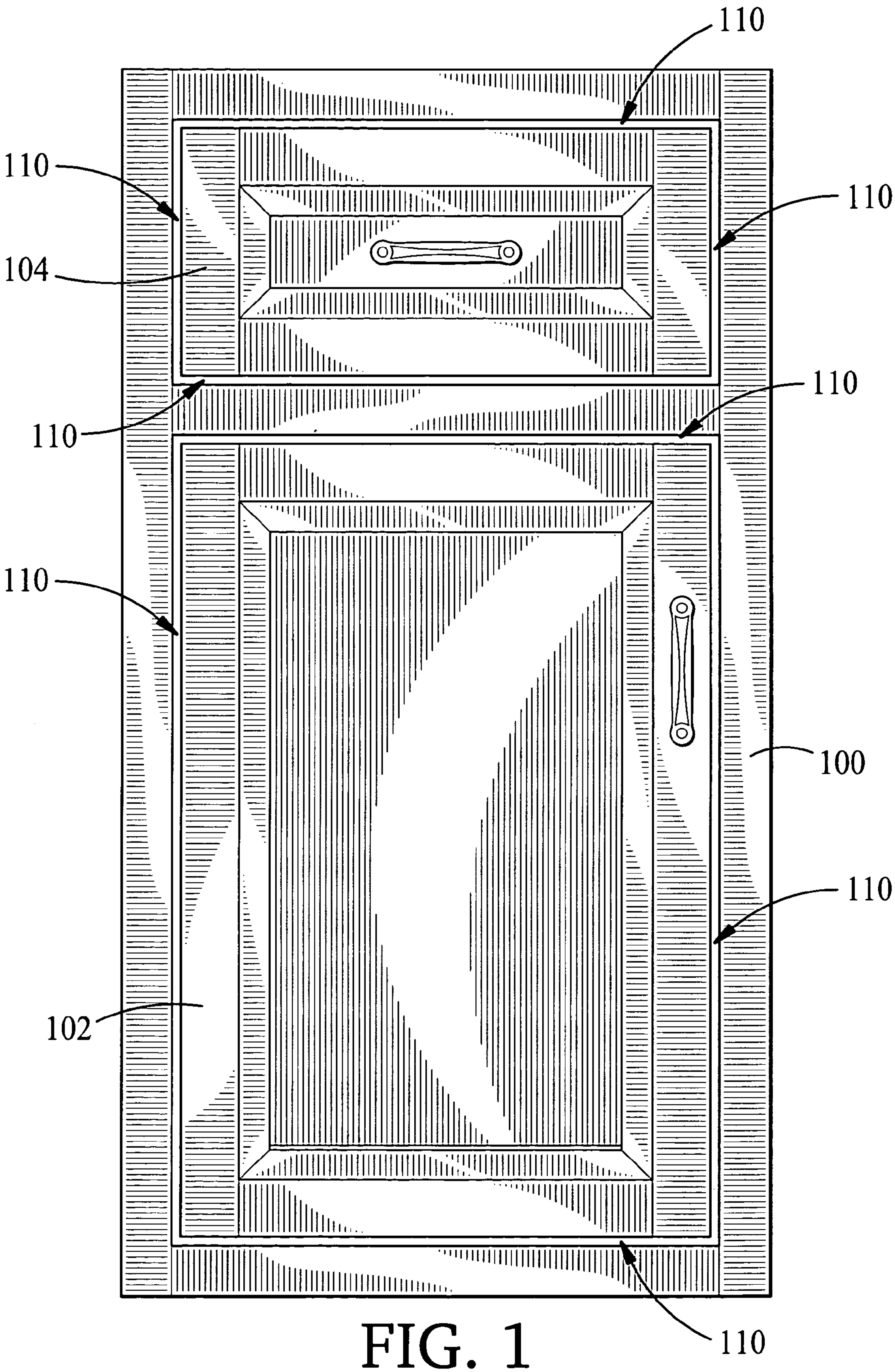
FIG. 1 is a front elevational view of a cabinet front with door and drawer front trimmed according to the present invention.

Reference should now be made to the drawing figures on which similar or identical elements are given consistent identifying numerals throughout the various figures thereof, and on which parenthetical references to figure numbers, when used, direct the reader to the view(s) on which the element(s) being described is (are) best seen, although the element(s) may be seen on other figures also.

FIG. 1 illustrates a cabinet front frame 100 having therein disposed therein an inset door 102 and an inset drawer front 104, the edges of both of the latter being flush with the cabinet front frame. It is noted that there is a uniform space, as at 110, between each side of door 102 and drawer front 104 and the corresponding edges of cabinet front frame 100. The dimension of this space is typically one-eighth-inch wide, although any desired space dimension may be chosen.

Figure 2:
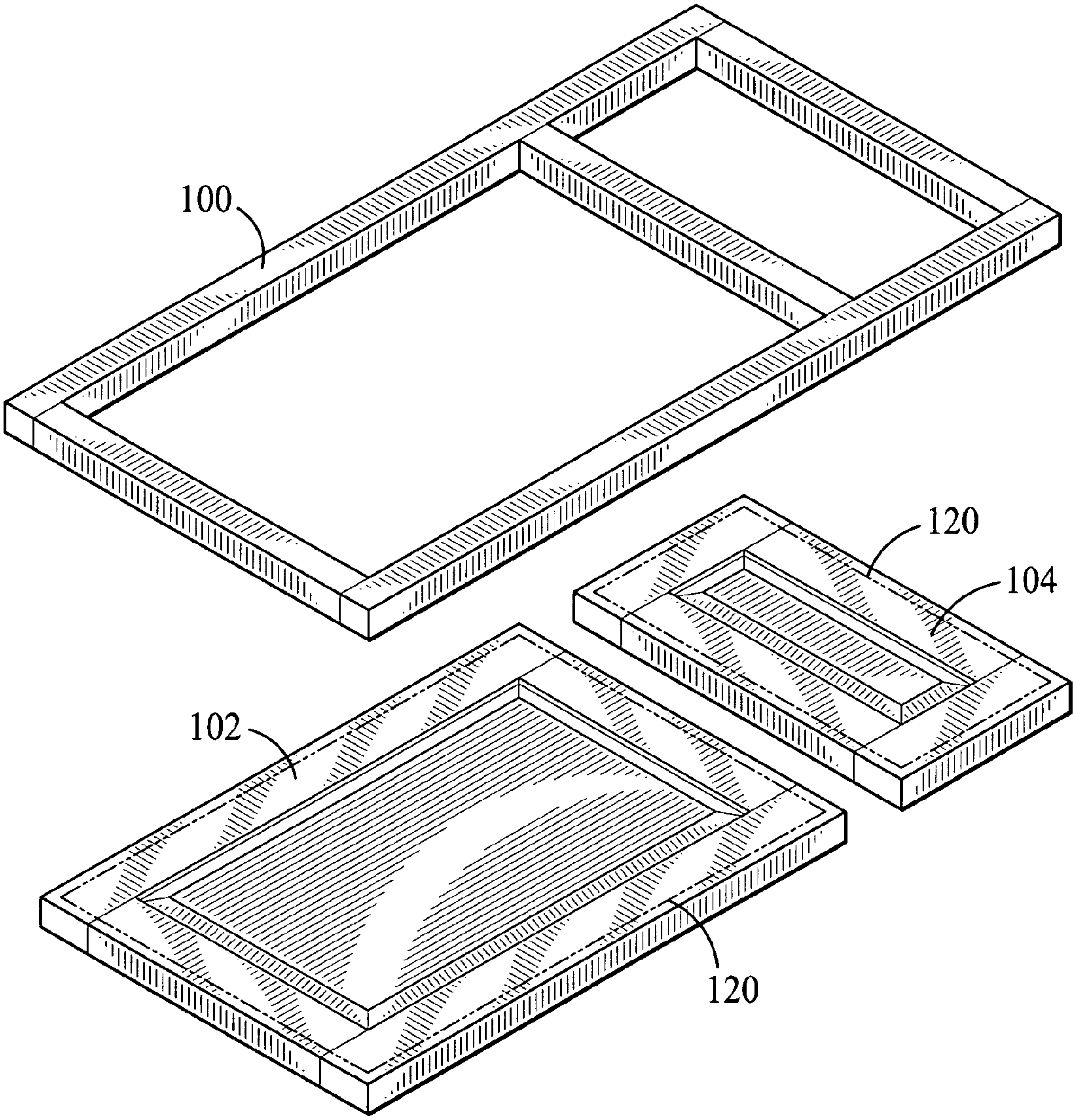
FIG. 2 is an exploded isometric view of the cabinet front, indicating the where scribe pins will be placed.

FIG. 2 illustrates cabinet front frame 100 spaced apart from door 102 and drawer front 104. The broken lines, as at 120, shown on door 102 and drawer front 104 will be described later.

Figure 3:
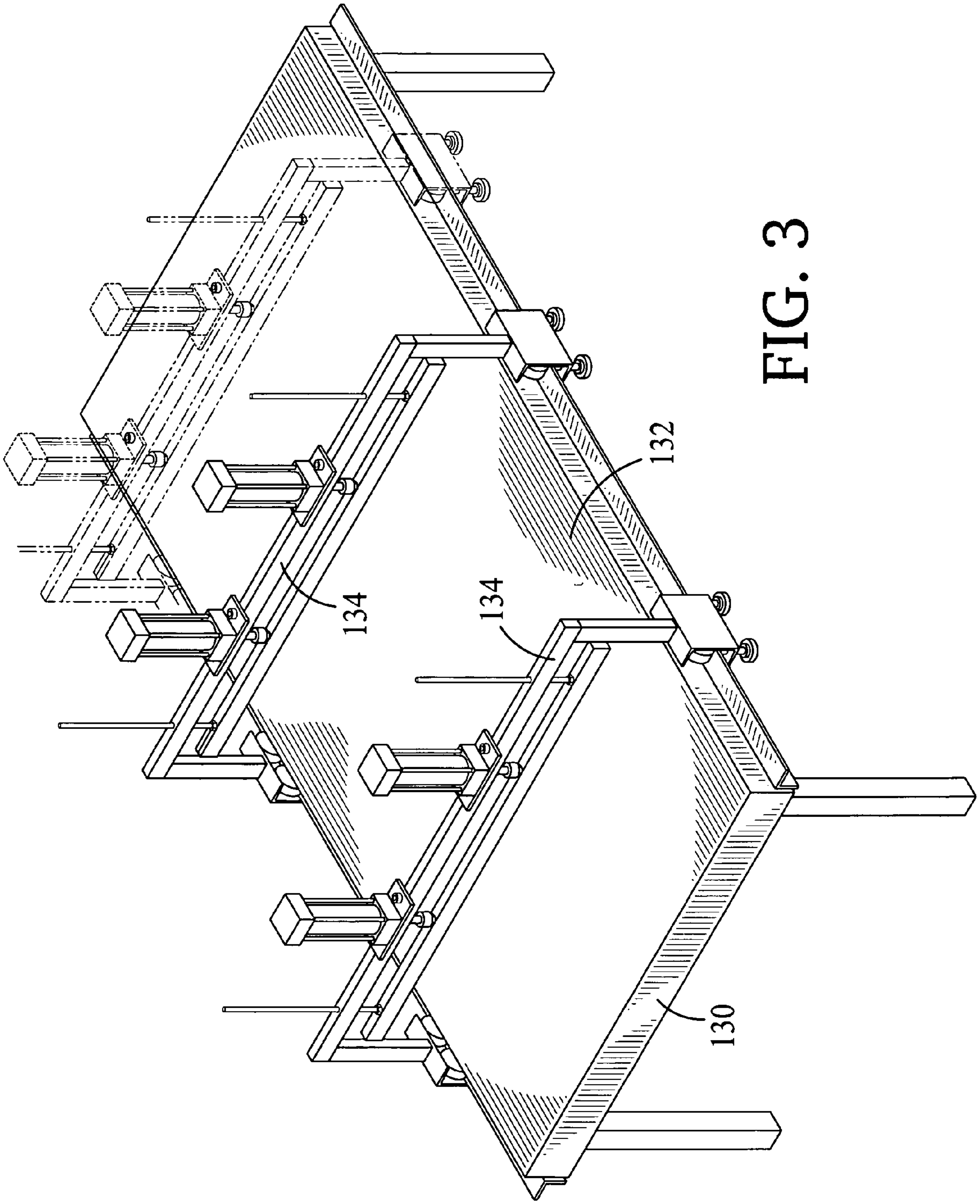
FIG. 3 is an isometric view of a table for use in preparing the door and drawer front.

FIG. 3 illustrates a setup table 130 having a horizontal working surface 132 and two hold down assemblies 134 movable horizontally therealong.

Figure 4:
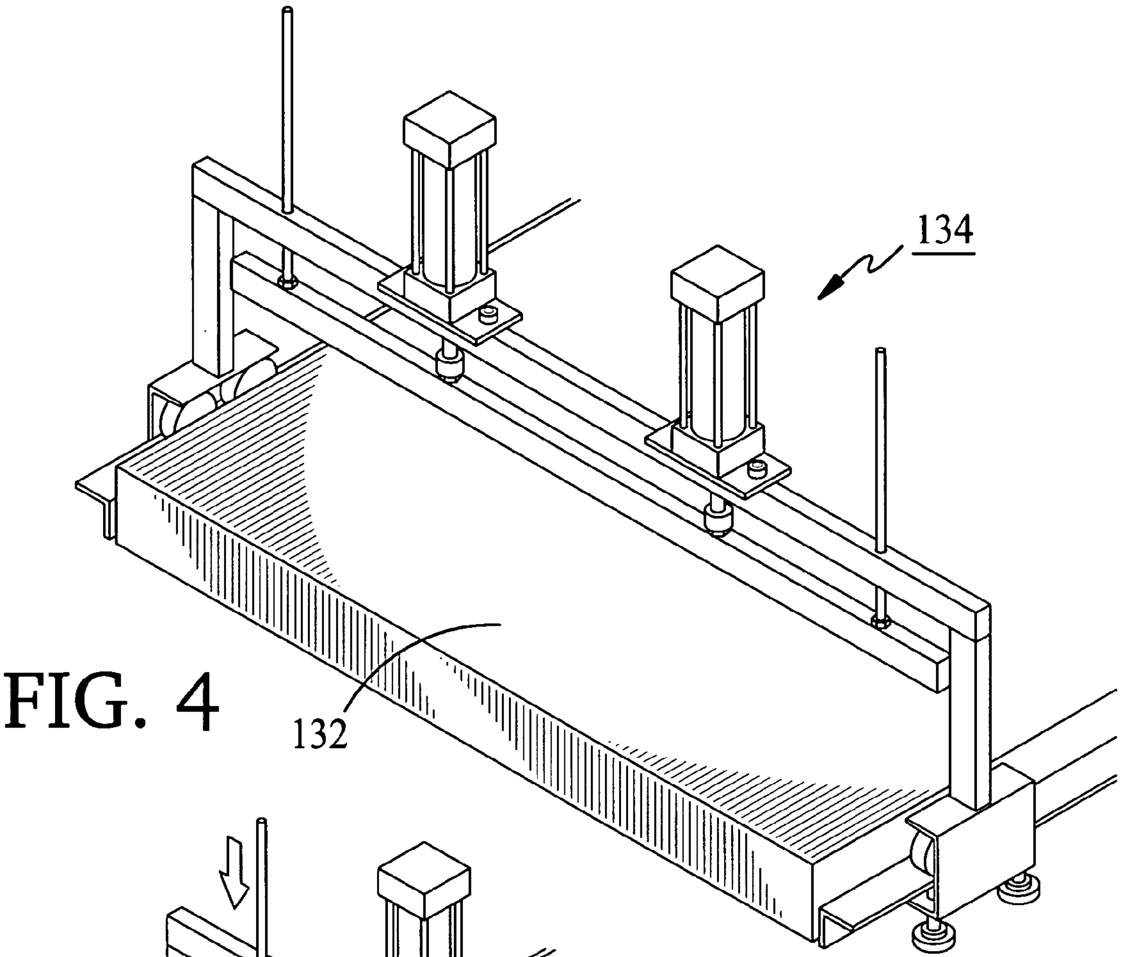
FIG. 4 is an isometric view of a clamp assembly for use with the table of FIG. 3.

FIG. 4 illustrates more clearly a hold down assembly 134.

Figure 5:
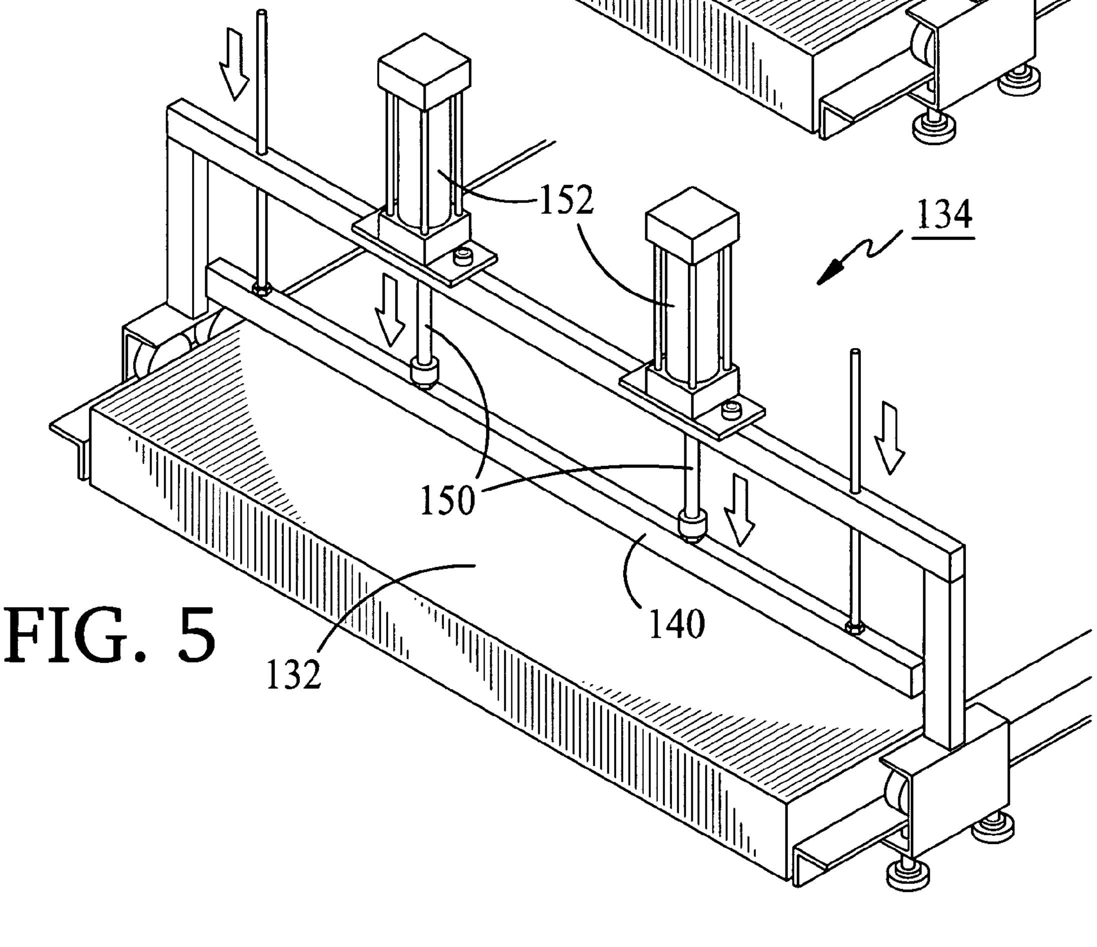
FIG. 5 is an isometric view showing that direction of clamping motion of the clamp of FIG. 4.

FIG. 5 illustrates the vertical motion of a clamp bar 140, in this case, the downward vertical motion is providing by the extension of pistons 150 from conventional hydraulic actuators 152. It will be noted that the control lines to and from hydraulic actuators 152 are omitted from the drawing figures, as well as other conventional control lines on other figures, the same being well known to those skilled in the art.

Figure 6:
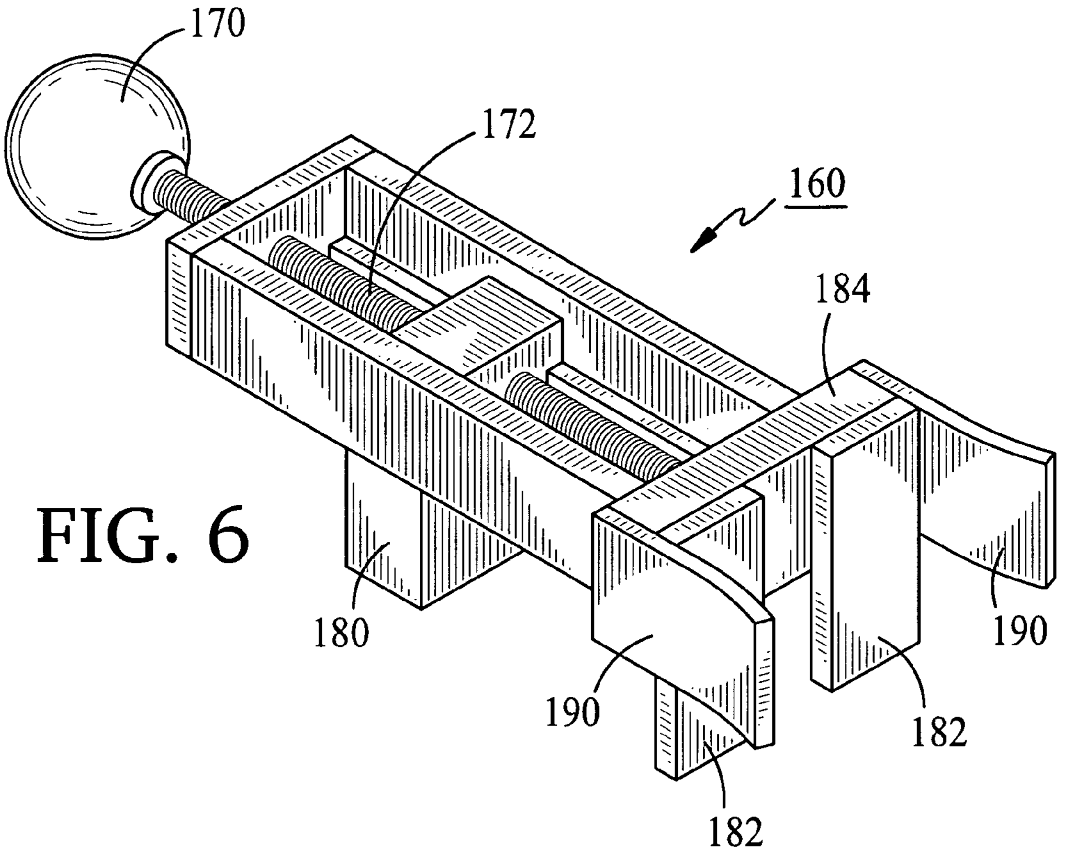
FIG. 6 is an isometric view of a first portion of a fixture for aligning scribe pins on the door and the drawer front.

FIG. 6 illustrates a first portion of a fixture for aligning scribe pins, generally indicated by the reference numeral 160. First portion 160 includes a knob 170 that turns a horizontal threaded screw 172 fixedly axially disposed with respect to first portion 160. Journaled for axial movement on screw 172 is a vertical outer frame engaging member 180 opposing, two, vertical inner frame engaging members 182 fixedly attached to an end member 184 to which screw 172 is rotatingly attached. Inner frame engaging members 182 are spaced apart horizontally and are attached to end member 184 inside of outwardly flared side members 190.

Figure 7:
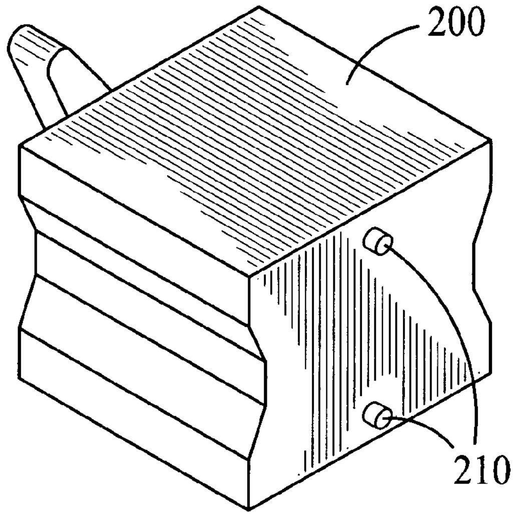
FIG. 7 is an isometric view of a second portion of a fixture for aligning scribe pins on the door and the drawer front.

FIG. 7 illustrates a second portion 200 of a fixture for aligning scribe pins. The pertinent parts of second portion 200 are two, vertically aligned pins 210 extending horizontally from an inner surface of the second portion.

Figure 8:
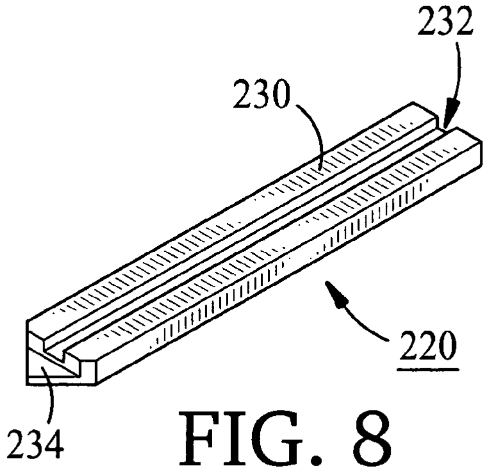
FIG. 8 is an isometric view of a scribe pin.

FIG. 8 illustrates a scribe pin generally indicated by the reference numeral 220. Scribe pin 220 includes an elongated body portion 230 having defined therealong a groove 232 and a point 234 disposed at one end thereof. The width of scribe pin 220 is equal to the spacing apart of inner frame engaging members 182 (FIG. 6) and the width of groove 232 is equal to the diameter of pins 210 (FIG. 7).

Figure 9:
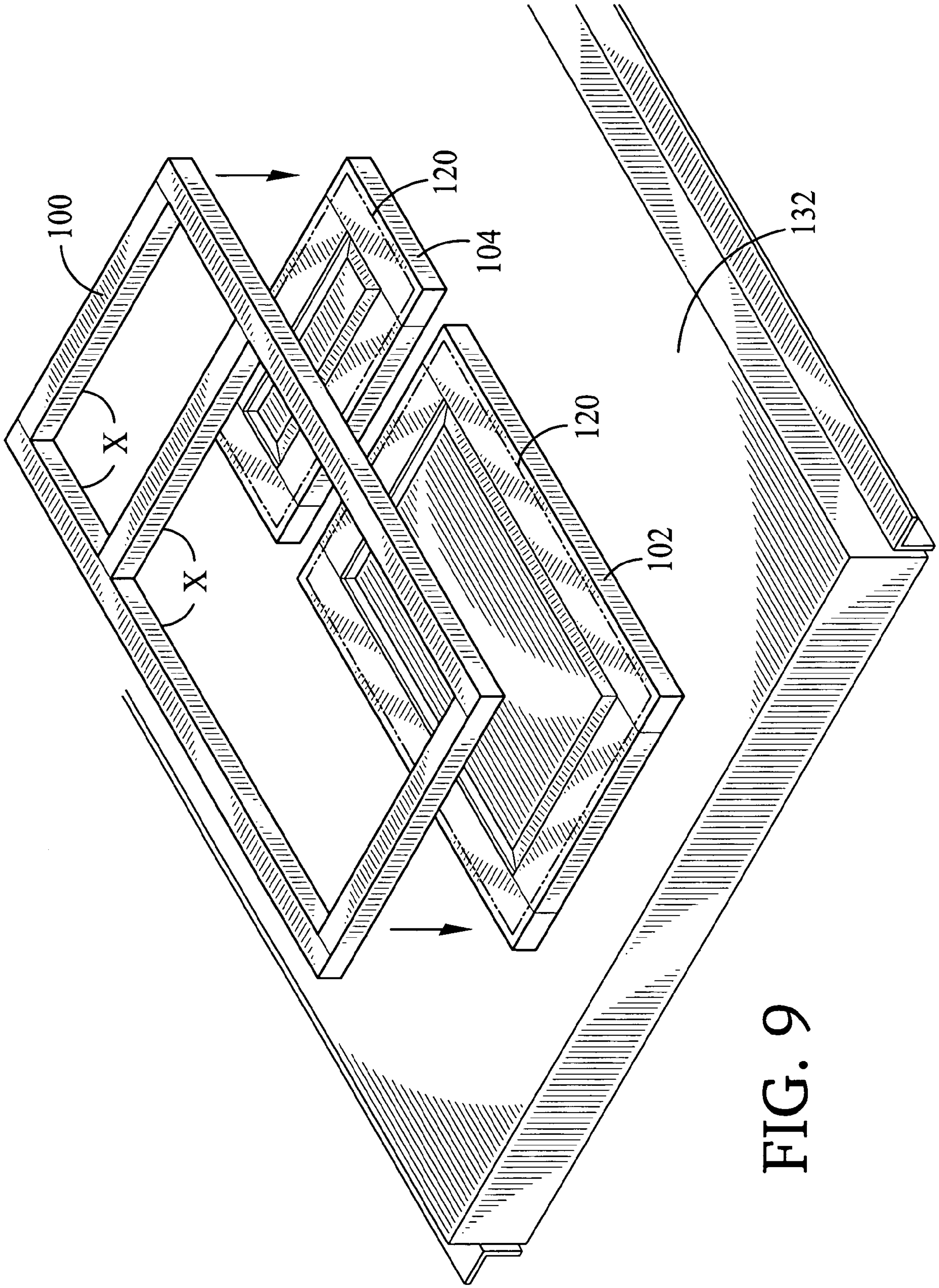
FIG. 9 is an isometric view of a cabinet front frame being placed on a door and a drawer front.

FIG. 9 illustrates cabinet front frame 100 positioned over door 102 and drawer front 104 and shows that the cabinet front frame will be lowered over the latter two elements. Cabinet front frame 100 will be positioned on door 102 and drawer front 104 so that the latter two elements are positioned equally within the cabinet front frame, so that the broken lines (not actually shown on the parts) are just within the inner edges of the cabinet front frame.

Figure 10:
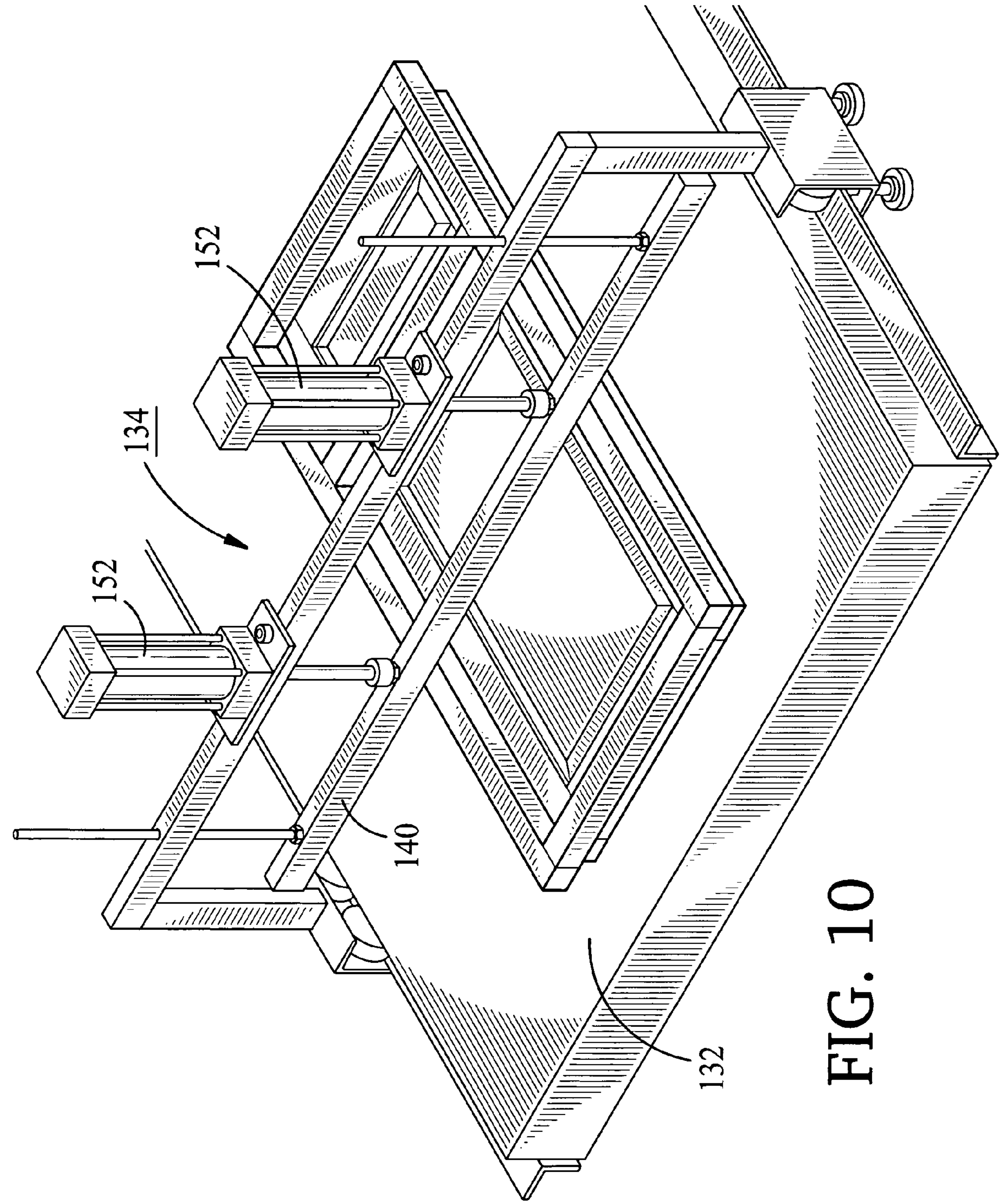
FIG. 10 is an isometric view of the cabinet front frame clamped on the door and the drawer front.

FIG. 10 illustrates that the three elements described above with reference to FIG. 9 have been properly aligned and clamp bar 140 has been lowered to clamp the three elements in place on horizontal working surface 132.

Figure 11:
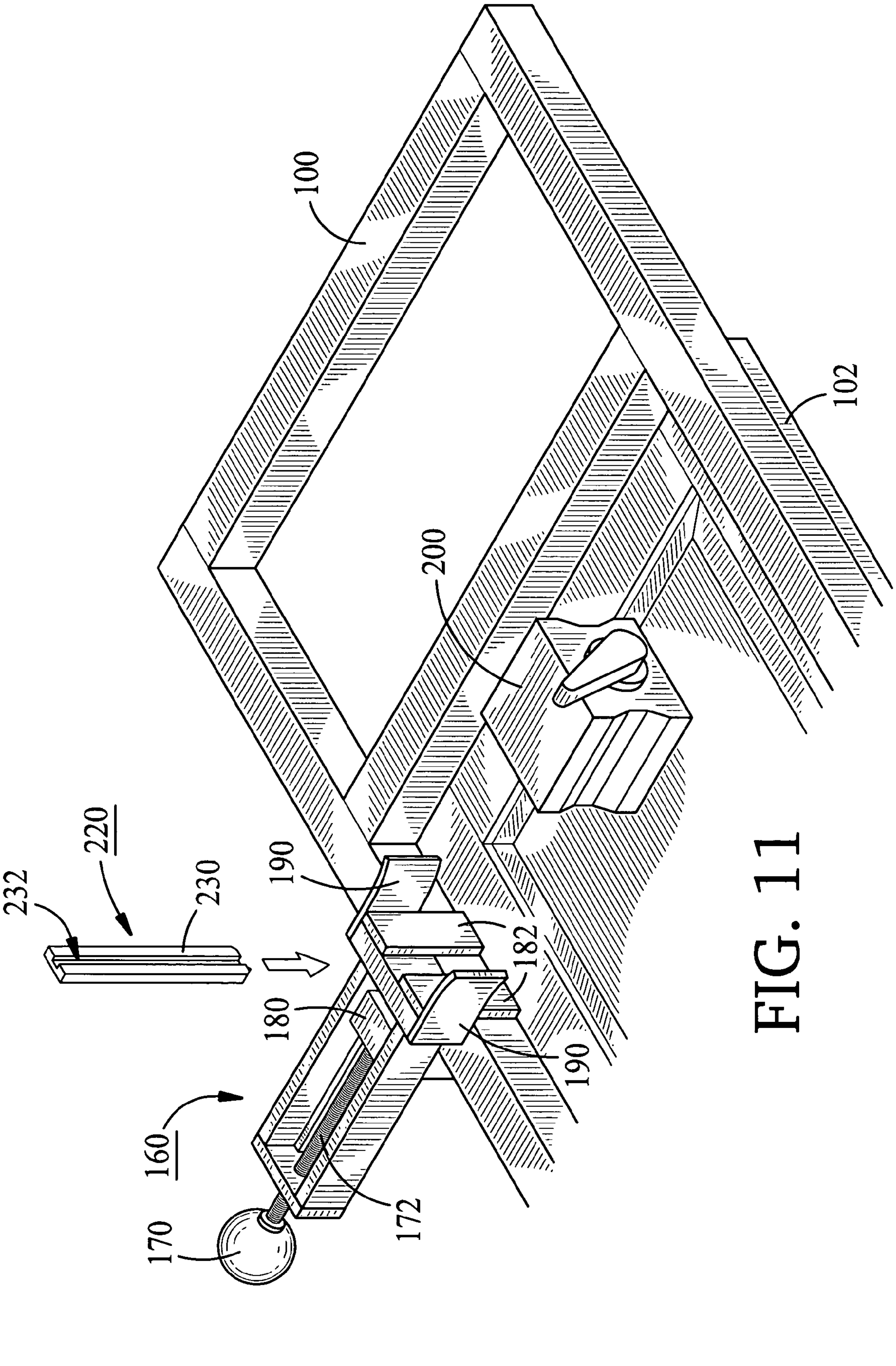
FIG. 11 is an isometric view of the first portion of the fixture for aligning scribe pins clamped in place on a portion of the frame, with a scribe pin being inserted therein, and the second portion of the fixture spaced apart from the first portion.

FIG. 11 illustrates first portion 160 clamped to a side of cabinet front frame 100 by advancing knob 170 and concomitantly screw 172 so that the inner surface of outer frame engaging member 180 engages the outer surface of the cabinet front frame and the inner surfaces of the two inner frame engaging members 182 engage the inner surface of the cabinet front frame. Now, scribe pin 220 can be inserted into the slot formed between inner frame engaging members 182. Second portion 200 is shown as being ready to be inserted into first portion 160. Drawer front 104 is not shown on FIG. 11 as it has been prepared and has been removed, the drawer front not being clamped by hold down assembly 134.

Figure 12:
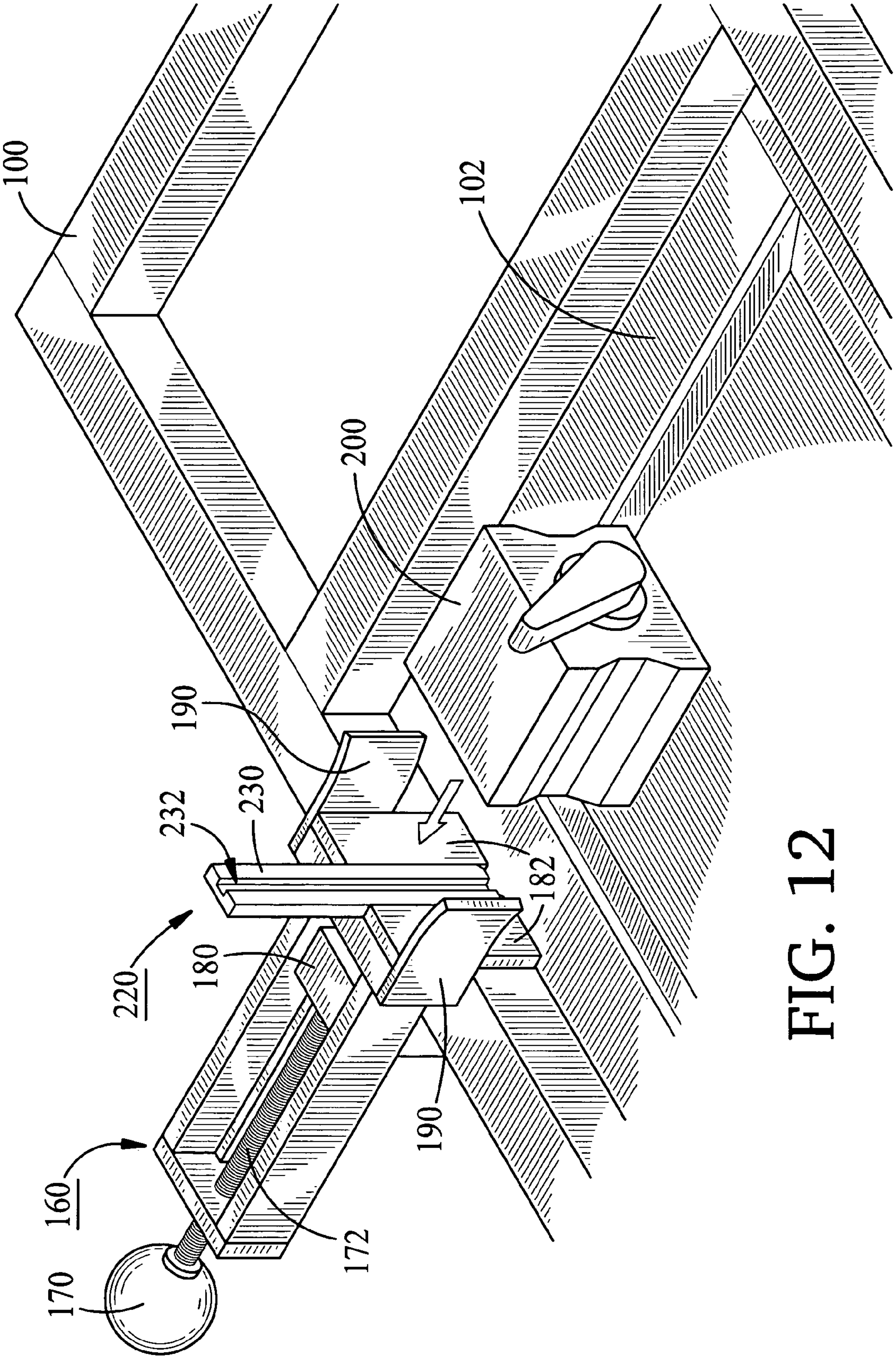
FIG. 12 is an isometric view of the scribe pin inserted in the first portion of the fixture for aligning scribe pins and indicating that the second portion is inserted in the first portion.

FIG. 12 illustrates scribe pin 200 inserted in the slot formed between inner frame engaging members 182 and second portion 200 being inserted into first portion 160.

Figure 13:
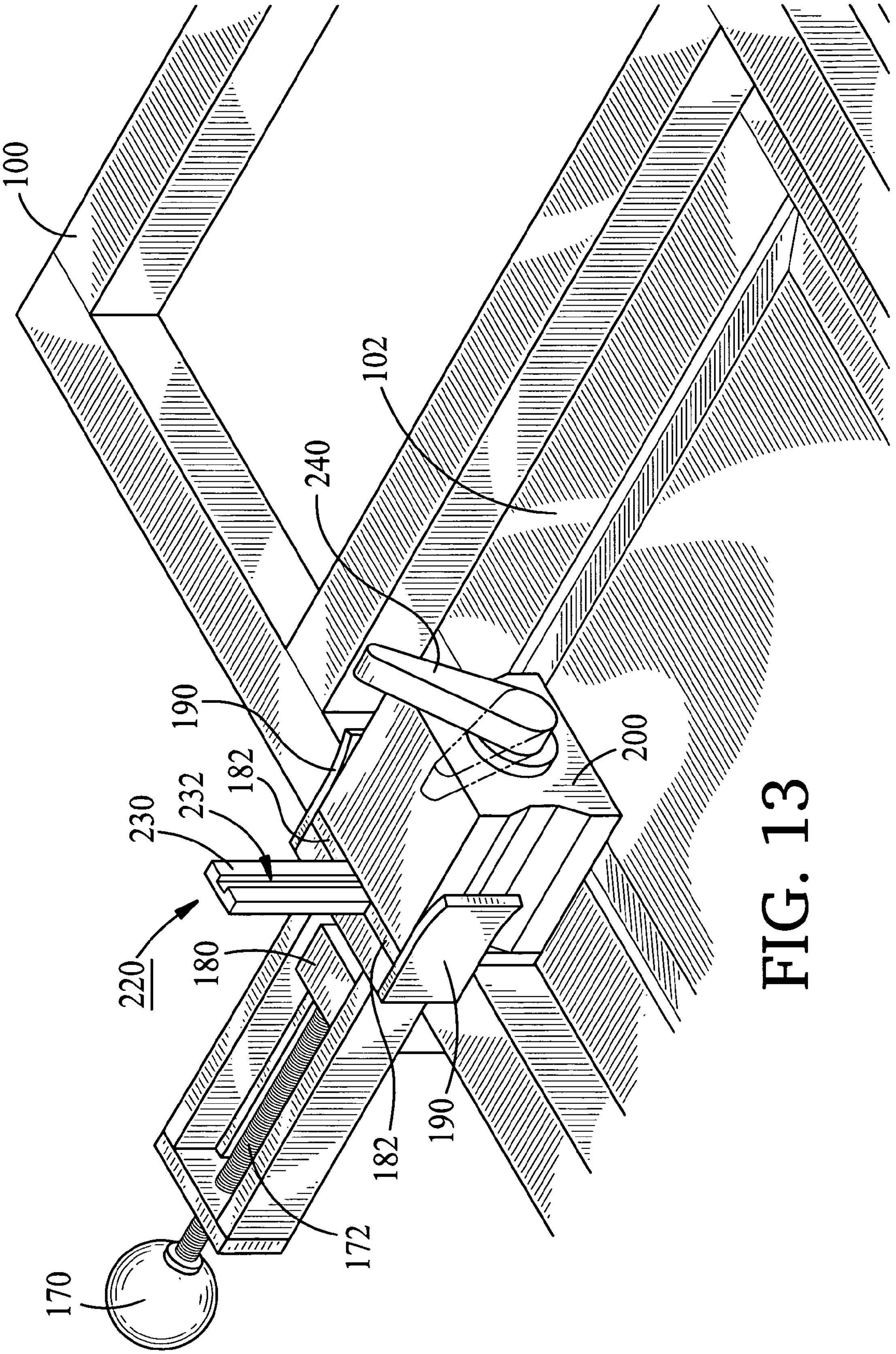
FIG. 13 is an isometric view of the fixture for aligning scribe pins, with the second portion inserted in the first portion and showing the locking action of the second portion.

FIG. 13 illustrates second portion 200 fully inserted into first portion 160 and magnetically locked therein by means of the partial turning of lever 240. Second portion is a conventional magnetically locked item. The partial turning of lever 240 realigns the N and S poles of an internal magnet to coincide with the N and S poles of another internal magnet so that there is an external magnetic force. Prior to the partial turning of lever 240 the N and S poles of the internal magnets are oppositely aligned so that there is no external magnetic force. Now, two or three sharp raps on the top of scribe pin 220 with a hammer, for example, drives point 234 (FIG. 8) into cabinet front frame 100. Scribe pin 220 is now firmly vertically disposed in cabinet front frame 100.

Figure 14:
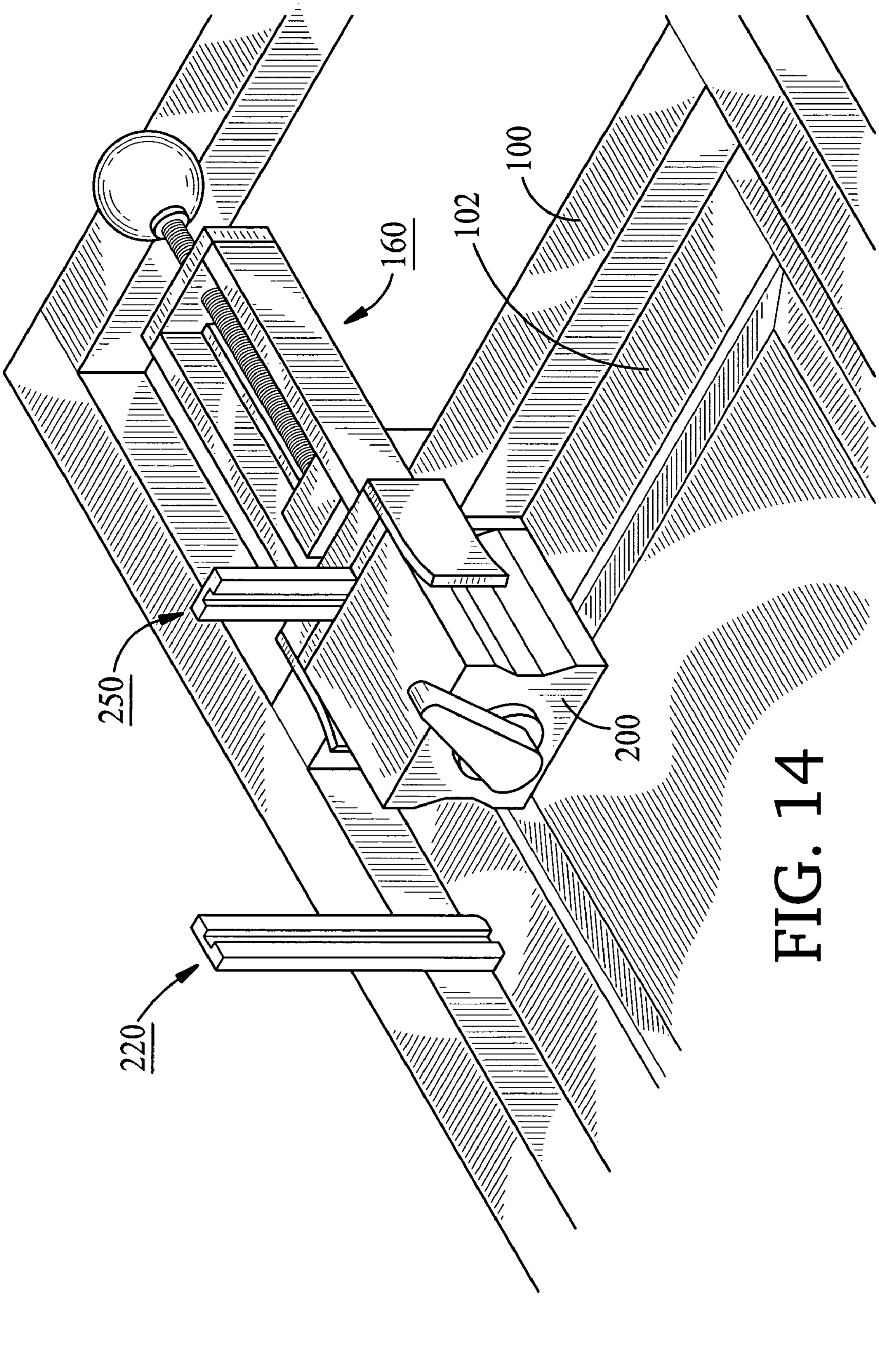
FIG. 14 is an isometric view of the fixture for aligning scribe pins repositioned to a second position.

FIG. 14 illustrates first and second portions 160 and 200, respectively, repositioned so that a second scribe pin 250 may be driven into cabinet front frame 100.

Figure 15:
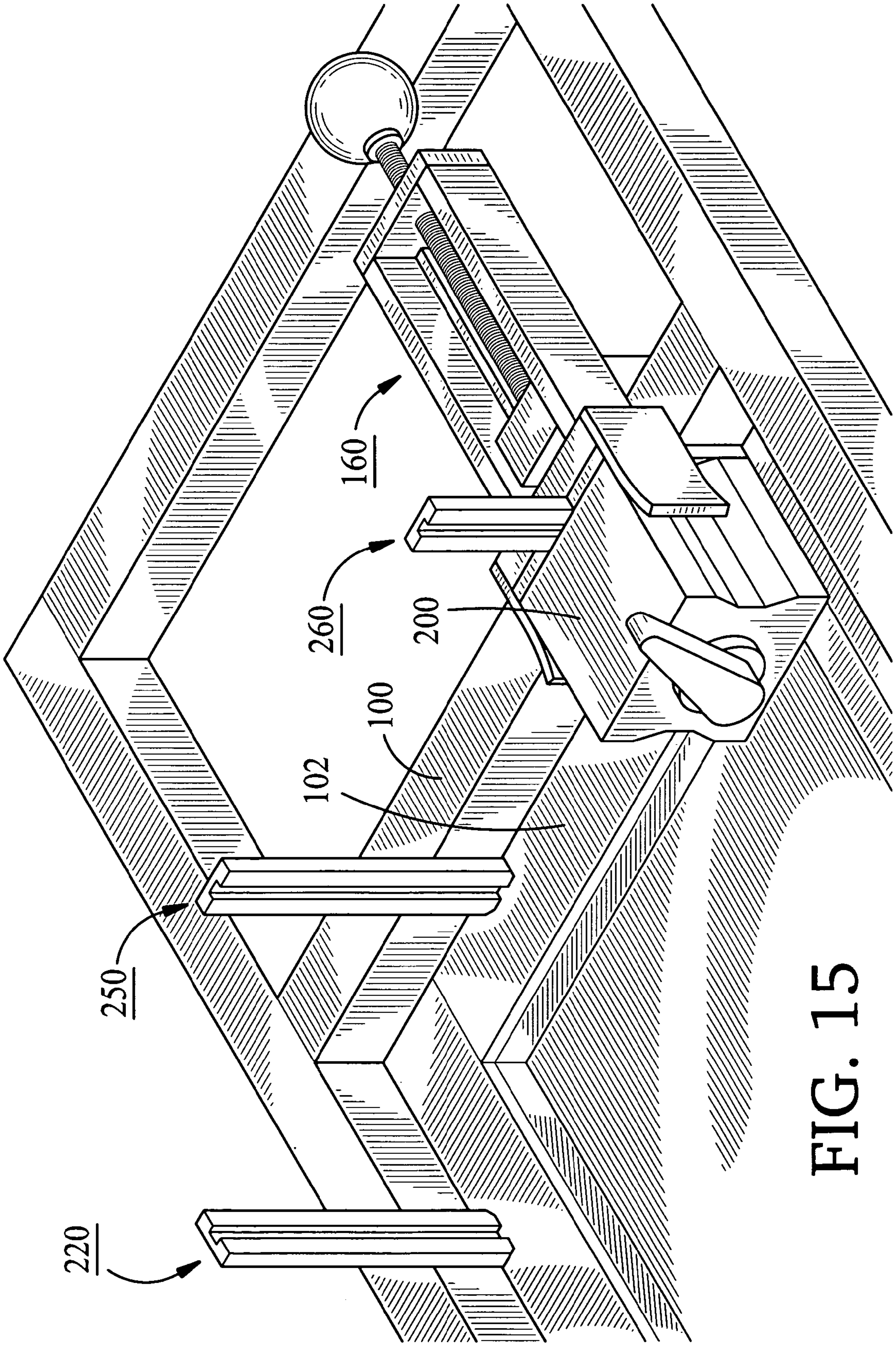
FIG. 15 is an isometric view of the fixture for aligning scribe pins repositioned to a third position.

FIG. 15 illustrates first and second portions 160 and 200, respectively, repositioned so that a third scribe pin 260 may be driven into cabinet front frame 100.

Figure 16:
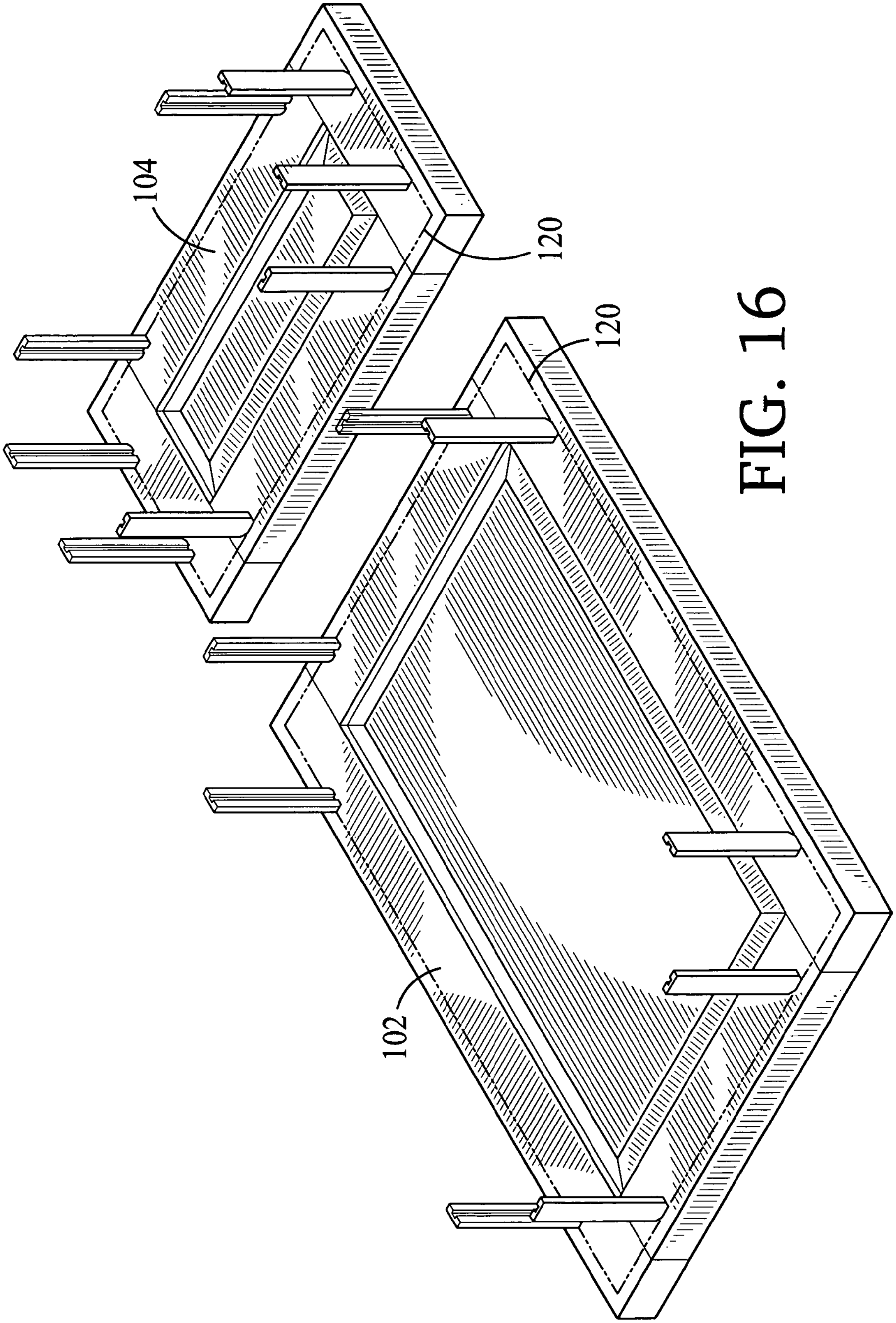
FIG. 16 is an isometric view showing eight scribe pins inserted in each of the door and the drawer front.

FIG. 16 illustrates door 102 and drawer front 104 with eight scribe pins each disposed along broken lines 120 as shown. It will be noted that the scribe pins are located generally close to corners of the respective elements.

Figure 17:
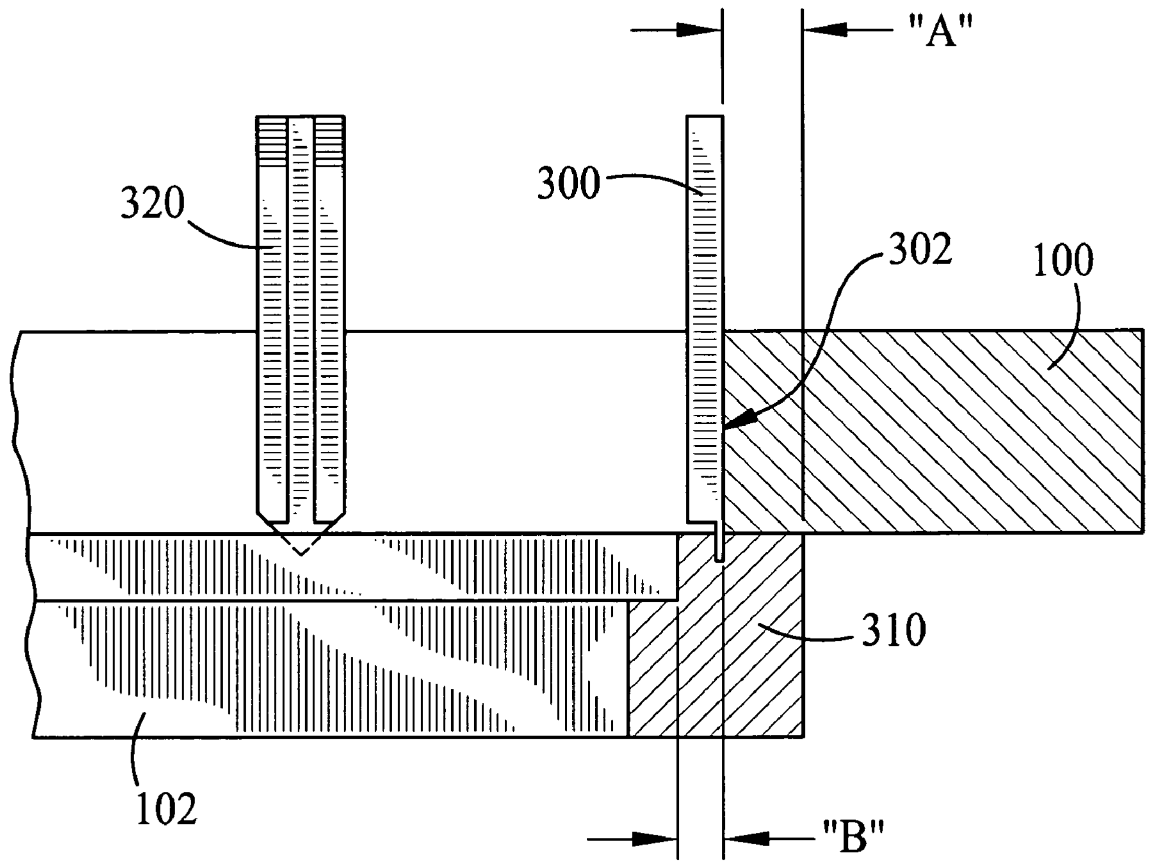
FIG. 17 is a side elevational view, partially in cross-section, showing the location of the scribe pins relative to the material to be removed.

FIG. 17 illustrates more clearly the material that will be removed and the relationship of the scribe pins and the material. Here, scribe pin 300 is shown driven into door 102 adjacent the inner wall 302 of cabinet front frame 100. "A" indicates the dimension between the inside of cabinet front frame 100 and the outside of door 102 before any portion of the door is removed. "B" indicates space 110 (FIG. 1) between door 102 and cabinet front frame 100. The portion of door 102 that will be removed is indicated by the reference numeral 310. Another scribe pin 320 has been driven into frame 100 against an adjacent surface of frame 100.

Figure 18:
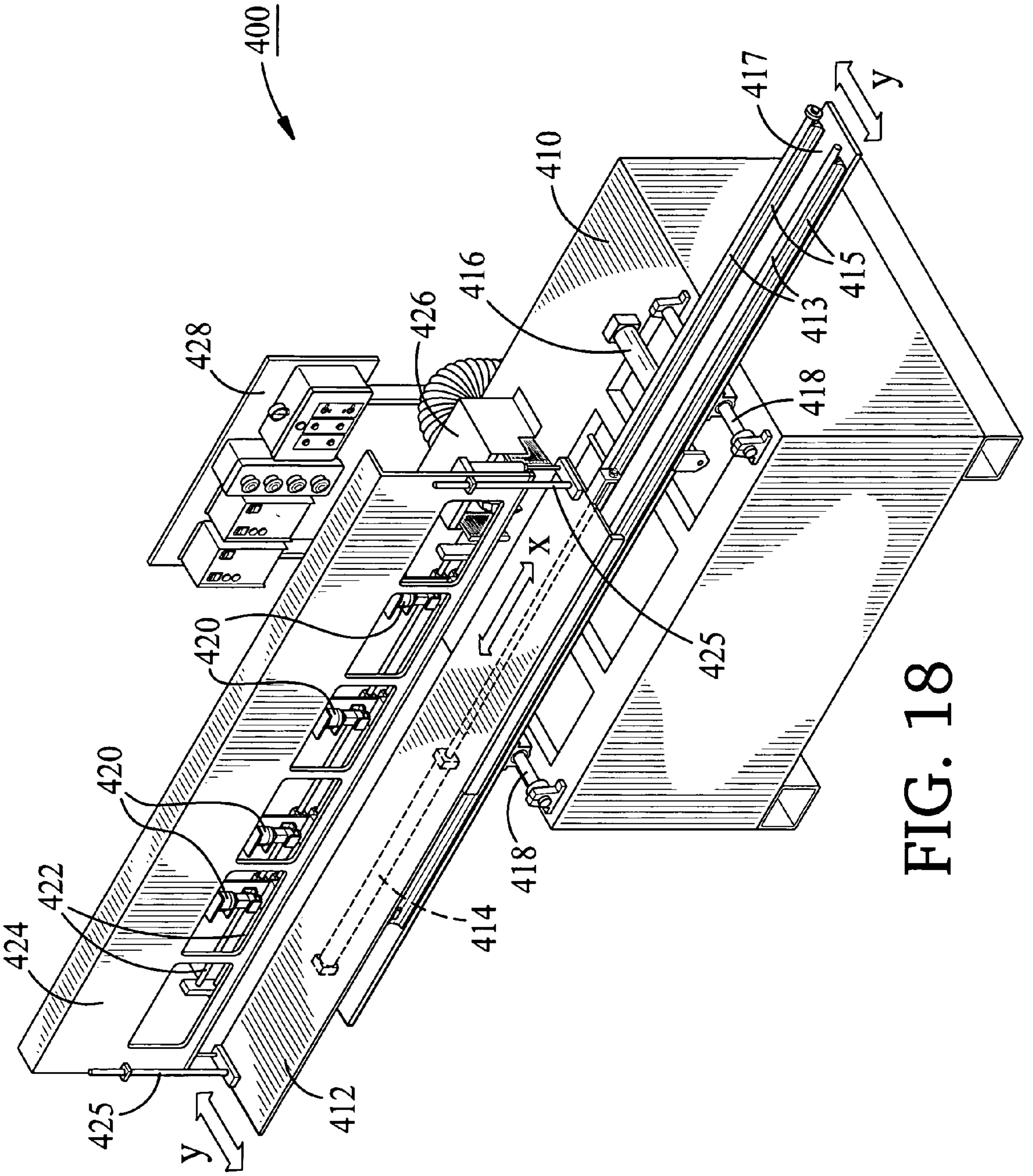
FIG. 18 is an isometric view of the machine for trimming the door and the drawer front.

FIG. 18 illustrates a trimming machine, constructed according to the present invention, and generally indicated by the reference numeral 400. The main elements of trimming machine 400 are a base 410, a first, horizontally movable, horizontal table 412, a first horizontal hydraulic cylinder 414 that moves the first movable table in the "X" direction. First moveable table 412 rides on rails two horizontal rails 413 fixedly attached to two rail supports 415 disposed at longitudinal edges of a second, horizontally movable, horizontal table 417. Second movable table 417 is fixedly attached to a second horizontal hydraulic cylinder 416 that moves second movable table 417 and first movable table 412 in the "Y" direction. Trimming machine 400 further includes two bearing structures 418 on which second movable table 417 is supported, four electromagnetic scribe pin removal assemblies 420 horizontally movable on a support rod 422, the latter element being fixedly disposed on the first movable table, a vertical clamping member 424 having supports 425 fixedly disposed on the first movable table, a cutter head housing 426 fixedly mounted on the base and in which is disposed a cutter head (not visible on FIG. 18), and a control panel 428.

Control lines are conventional and are not shown on the drawing figures for clarity. Hydraulic components may be substituted by, for example, conventional electrical components, the exact choice not being part of the present invention.

Figure 19:
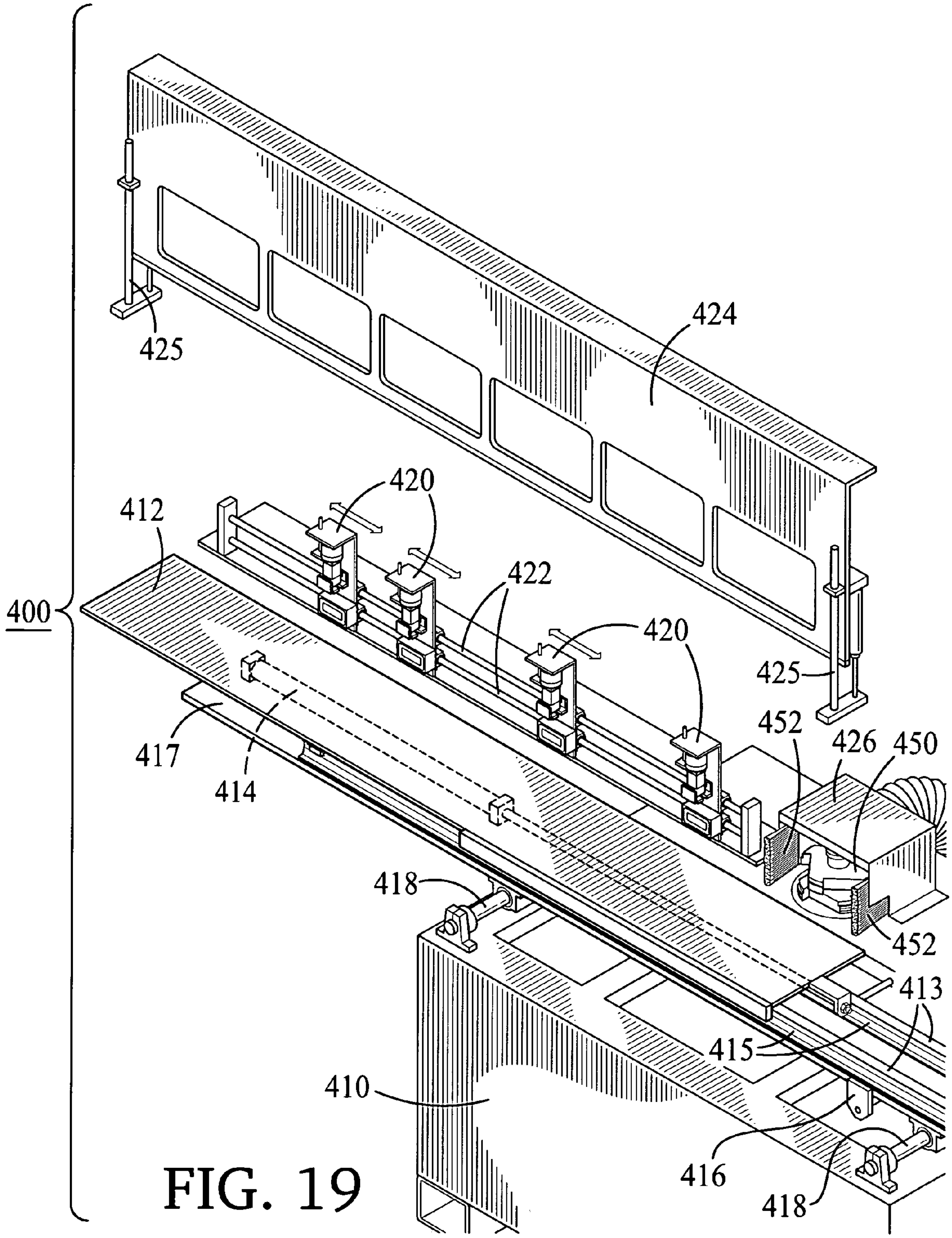
FIG. 19 is a fragmentary, exploded, isometric view of the trimming machine showing more clearly the clamp, the electromagnetic scribe pin removal assemblies, the moving table, and the cutting head.

FIG. 19 illustrates in more detail some of the elements of trimming machine 400. In particular, cutter head 450 is shown as is vertical paint brush bristles 452 on either side of the cutter head to remove wood chips and sawdust from a workpiece (not shown on FIG. 19).

Figure 20:
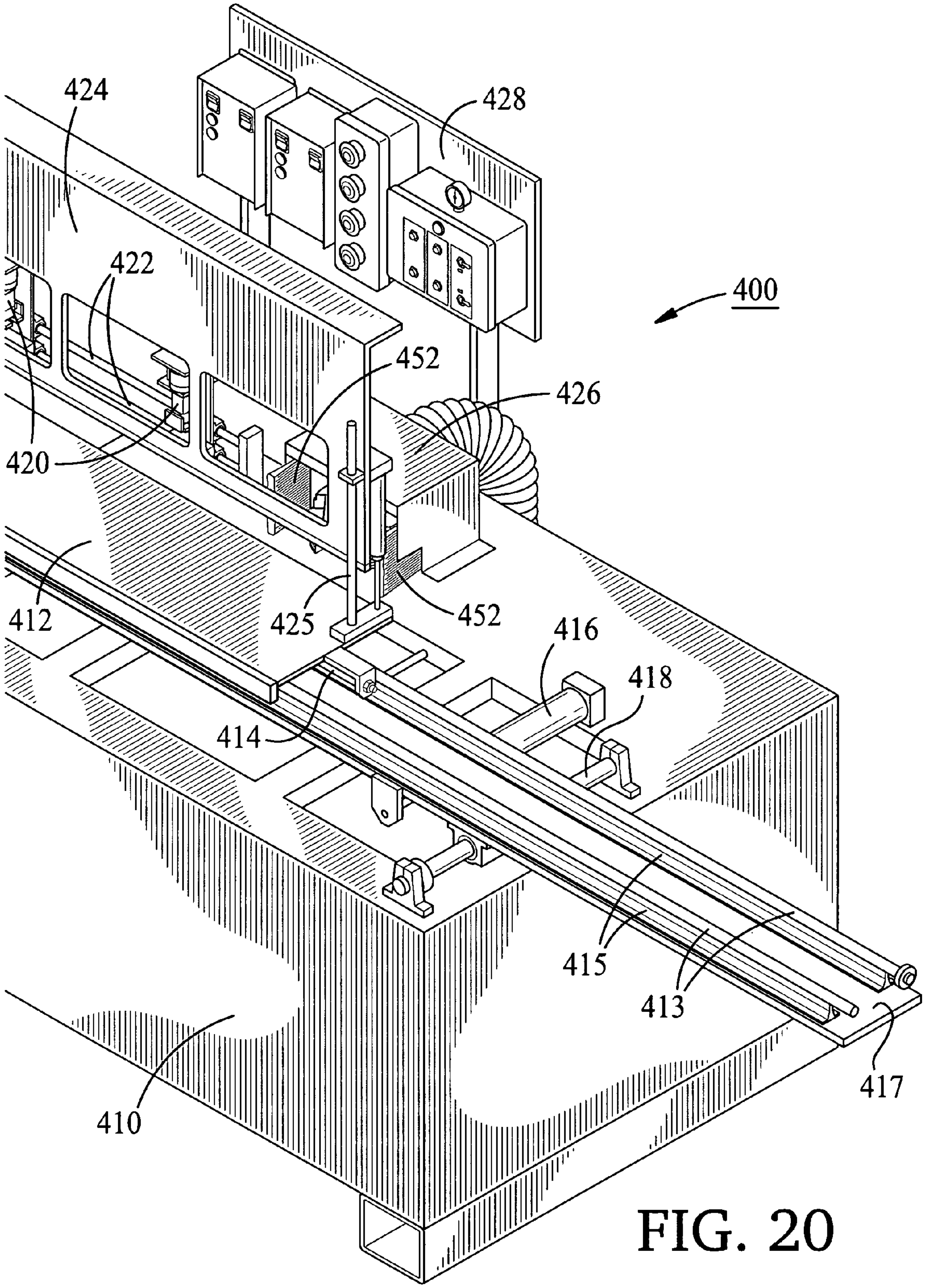
FIG. 20 is a fragmentary, isometric view of the trimming machine showing more clearly the control panel and the mechanism for moving the moving table in the "Y" direction.

FIG. 20 also illustrates in more detail some of the elements of trimming machine 400.

Figure 21:
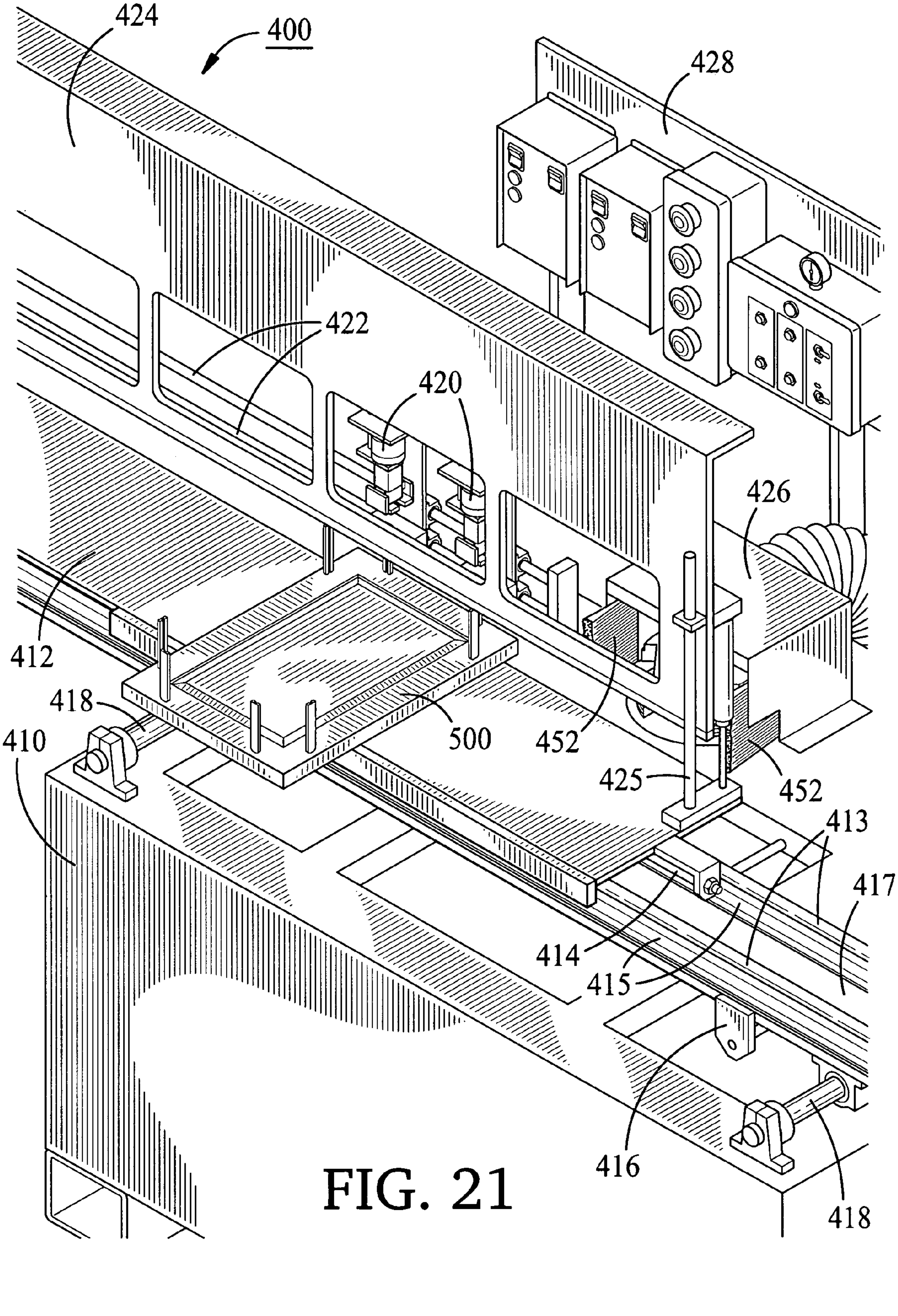
FIG. 21 is a fragmentary, isometric view of the trimming machine showing a workpiece in place on the moving table.

FIG. 21 illustrates a workpiece 500 placed on first movable table 412, with vertical clamping member 424 in a raised position.

Figure 22:
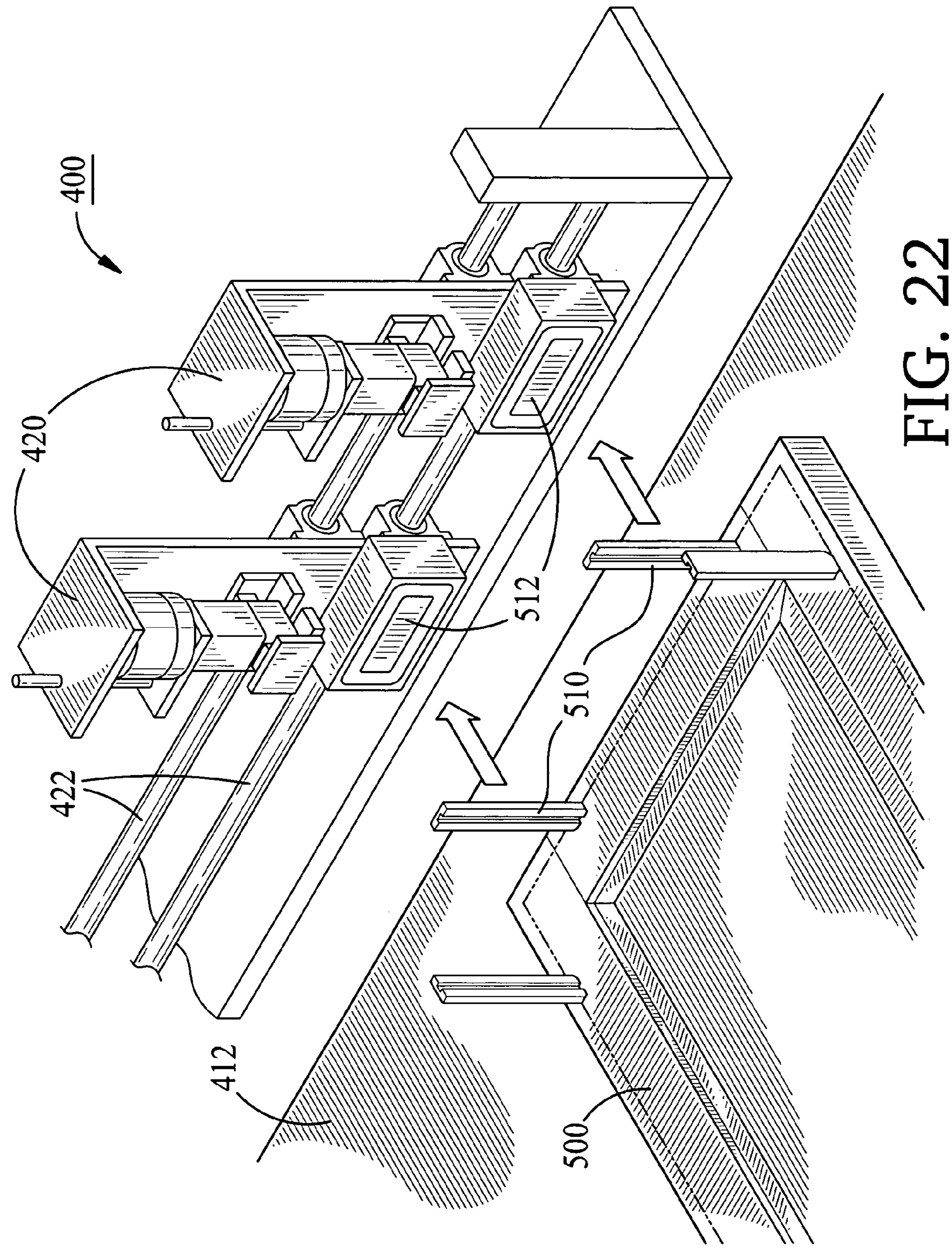
FIG. 22 is a fragmentary, isometric view of the trimming machine showing how two scribe pins are placed against the electromagnetic scribe pin removal assemblies.

On FIG. 22, two of electromagnetic scribe pin removal assemblies 420 have been aligned with vertical scribe pins 510 and workpiece 500 is advanced in the direction indicated by the arrows until the scribe pins engage vertical electromagnets 512 on the electromagnetic scribe pin removal assemblies. Vertical clamping member 424 is still raised but is omitted from FIG. 22 for clarity.

Figure 23:
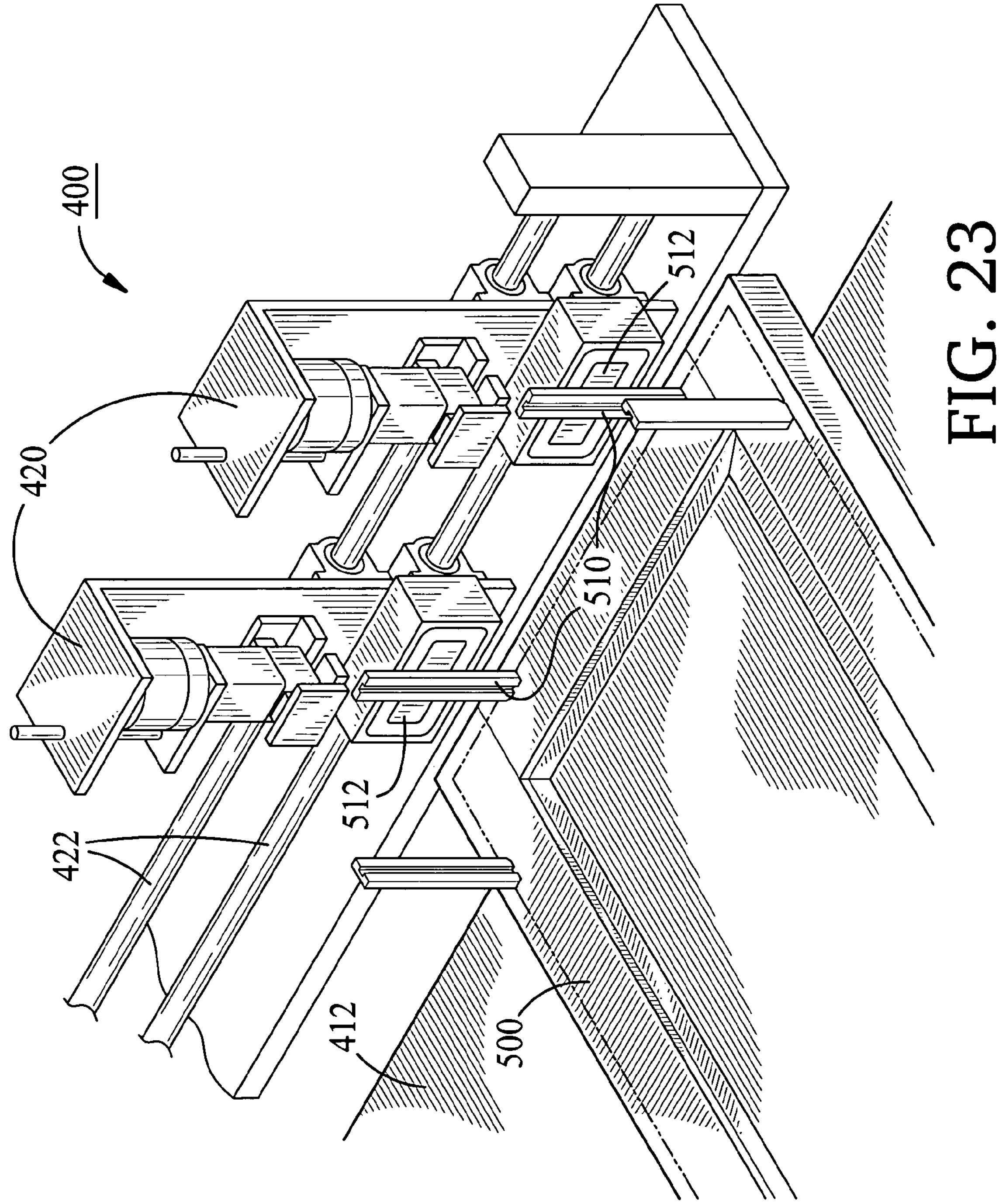
FIG. 23 is a fragmentary, isometric view of the trimming machine showing a workpiece with two of the scribe pins engaging two of the electromagnetic scribe pin removal assemblies.

On FIG. 23, scribe pins 510 are shown engaging vertical electromagnets 512. Scribe pins 510 remain orthogonal with respect to workpiece 500. This sets the amount of the edge of workpiece 500 to be trimmed. Again, vertical clamping member 424 is still raised but is omitted from FIG. 23 for clarity.

Figure 24:
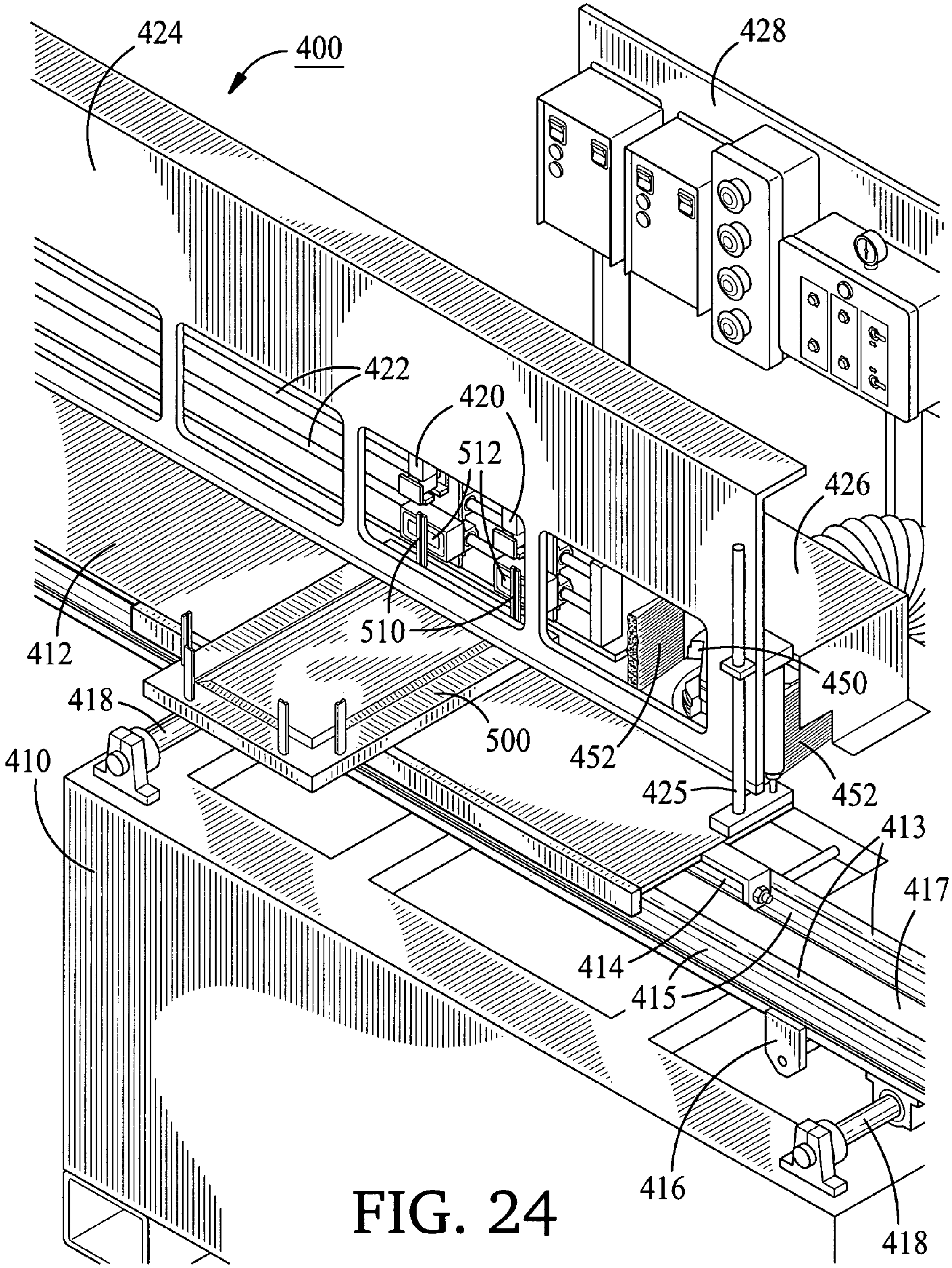
FIG. 24 is a fragmentary, isometric view of the trimming machine with the vertical clamping mechanism clamping the workpiece to the moving table.

FIG. 24 illustrates vertical clamping member 424 lowered, clamping workpiece 500 against movable table 412.

Figure 25:
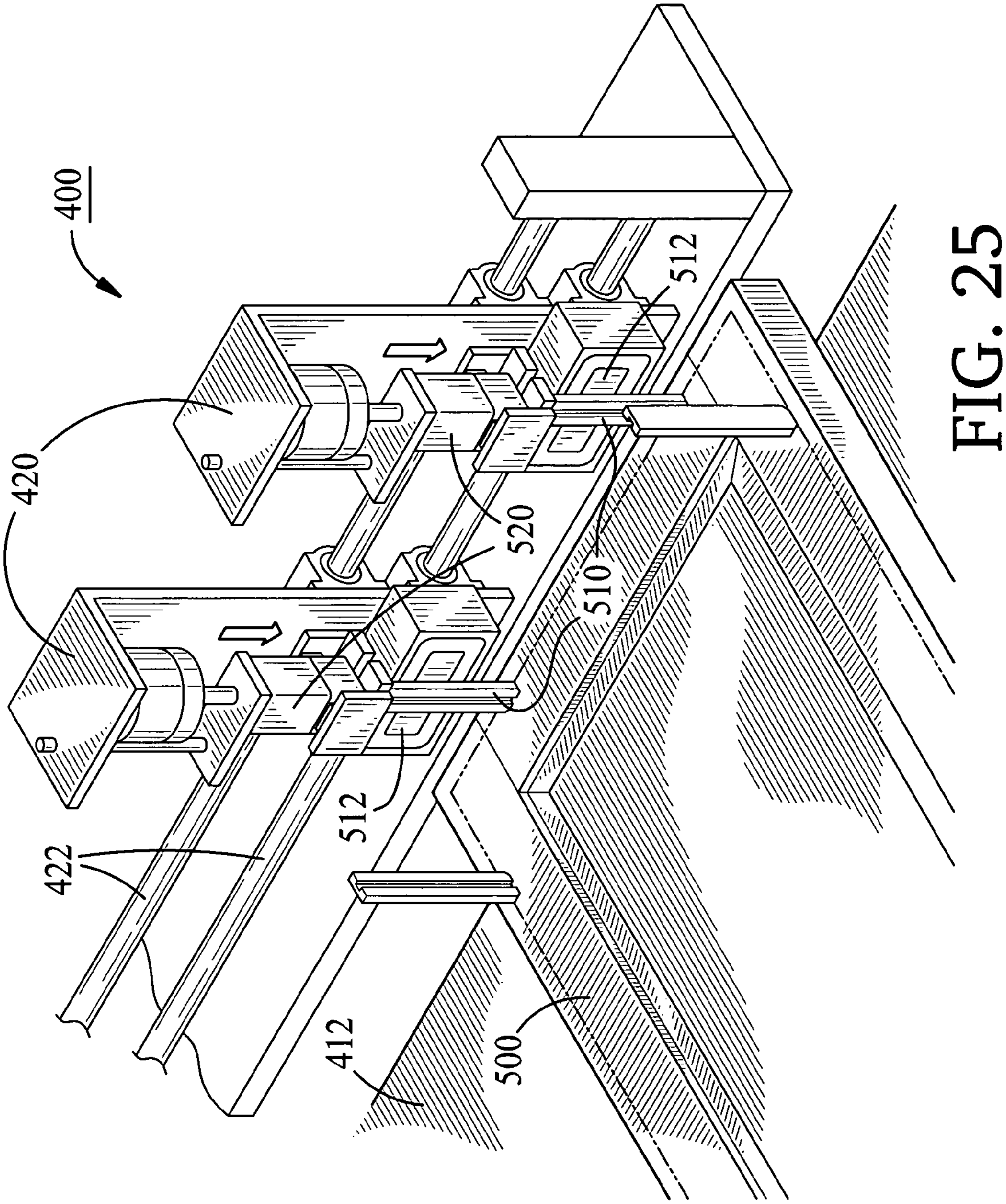
FIG. 25 is a fragmentary, isometric view of the trimming machine showing upper portions of the two electromagnetic scribe pin removal assemblies being lowered to grasp the scribe pins.

FIG. 25 illustrates the upper portions 520 of electromagnetic scribe pin removal assemblies lowered in the direction of the arrows on FIG. 25 to grasp the upper portions of scribe pins 510, while maintaining the position of the scribe pins. Vertical clamping member 424 is still in the clamped position but is omitted from FIG. 25 for clarity.

Figure 26:
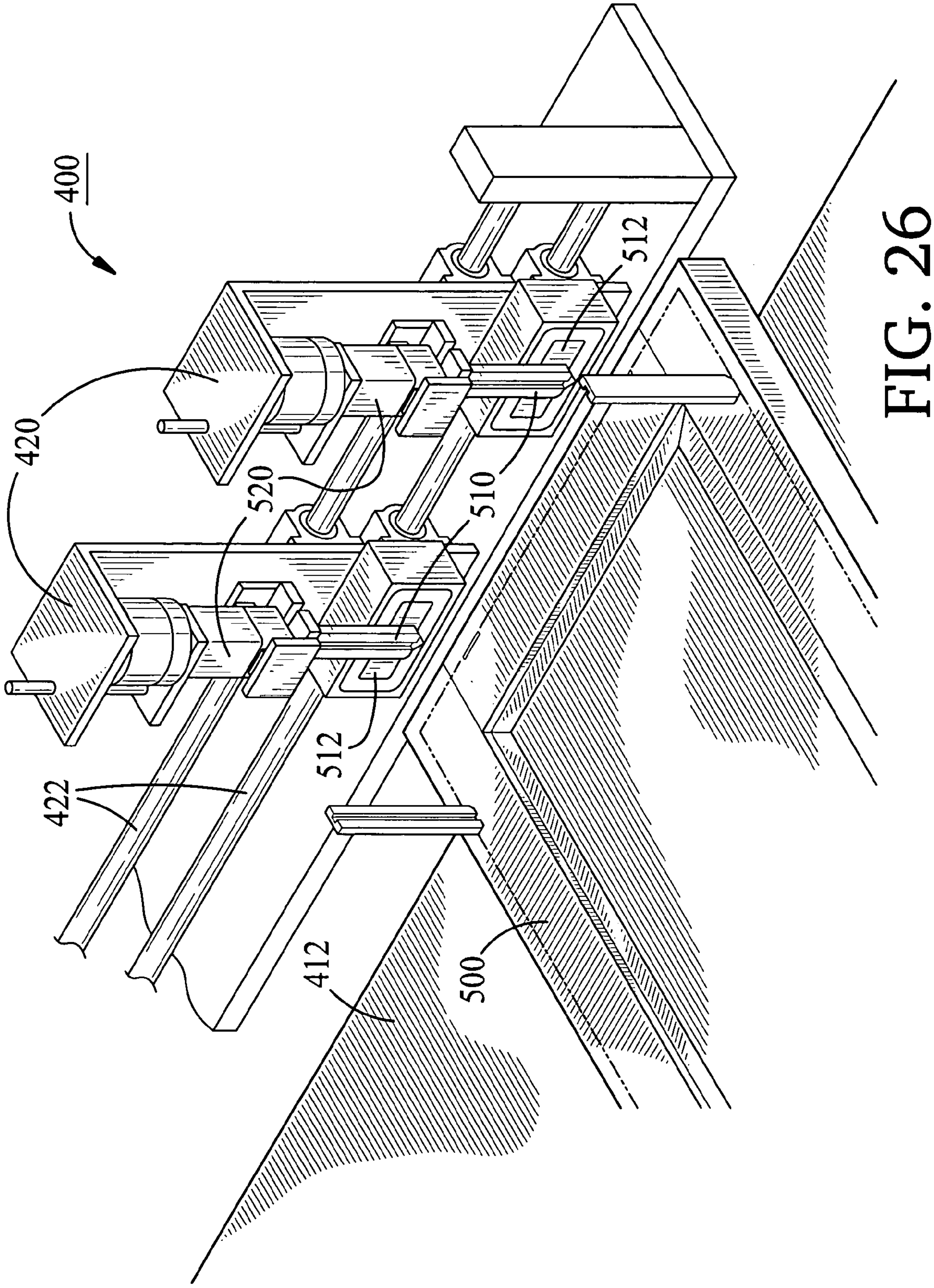
FIG. 26 is a fragmentary, isometric view of the trimming machine showing the two scribe pin removal assemblies removing two of the scribe pins.

FIG. 26 illustrates scribe pins 510 being removed vertically from workpiece 500 by upper portions 520 of electromagnetic scribe pin removal assemblies. Again, vertical clamping member 424 is still in the clamped position but is omitted from FIG. 26 for clarity.

FIGS. 27–33 illustrate the trimming process of the present invention.

Figure 27:
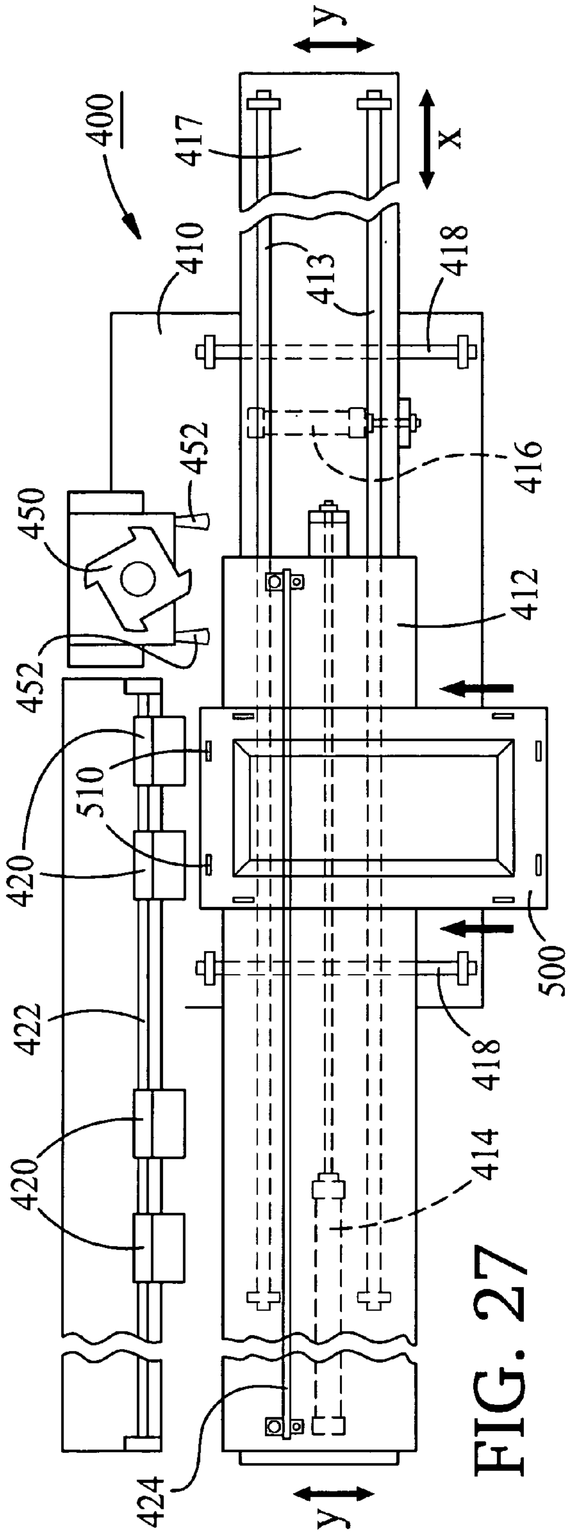
FIG. 27 is a top plan view of the trimming machine showing the "X" and "Y" motions of the moving table.
Figure 28:
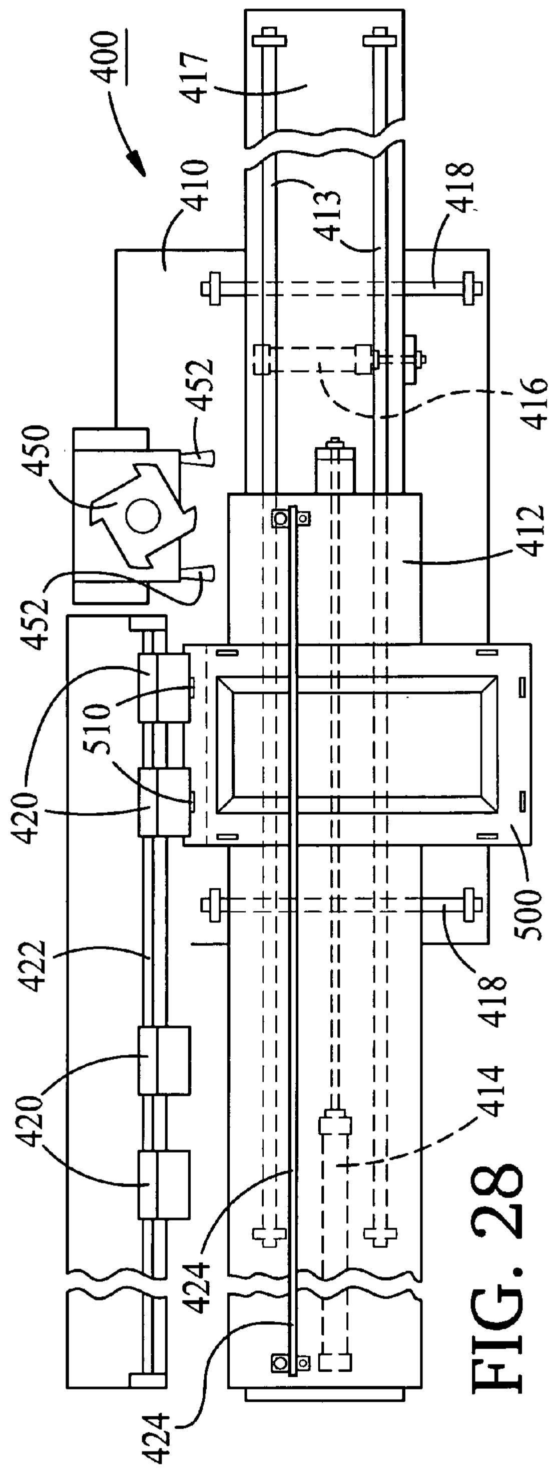
FIG. 28 is a top plan view of the trimming machine showing the workpiece clamped in place on the moving table and ready to start the trimming operation.

FIG. 27 illustrates that first movable table 412 can be selectively positioned in the "X" and the "Y" directions as indicated by the arrows labeled "X" and "Y", the latter position by virtue of second movable table being moved in the "Y" direction. Workpiece 500 is advanced into trimming machine 400, with vertical clamping member 424 raised, until scribe pins 510 engage electromagnetic scribe pin removal assemblies 420 as shown on FIG. 28 and vertical clamping member 424 is lowered.

Figure 29:
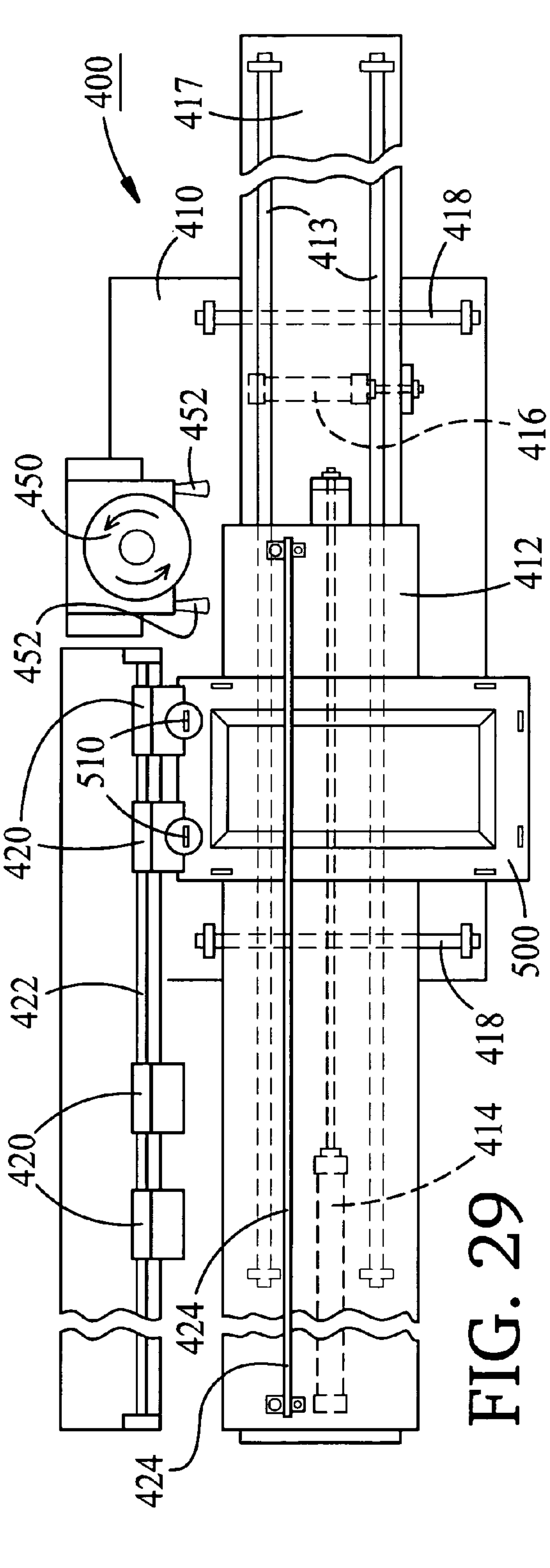
FIG. 29 is a top plan view of the trimming machine showing two of the scribe pins removed from the workpiece and the cutter head rotating.

On FIG. 29, scribe pins 510 have been grasped by upper portions 520 (FIG. 25) of electromagnetic scribe pin removal assemblies 420 and the scribe pins pulled from workpiece 500. Cutter head 450 has been started rotating.

Figure 30:
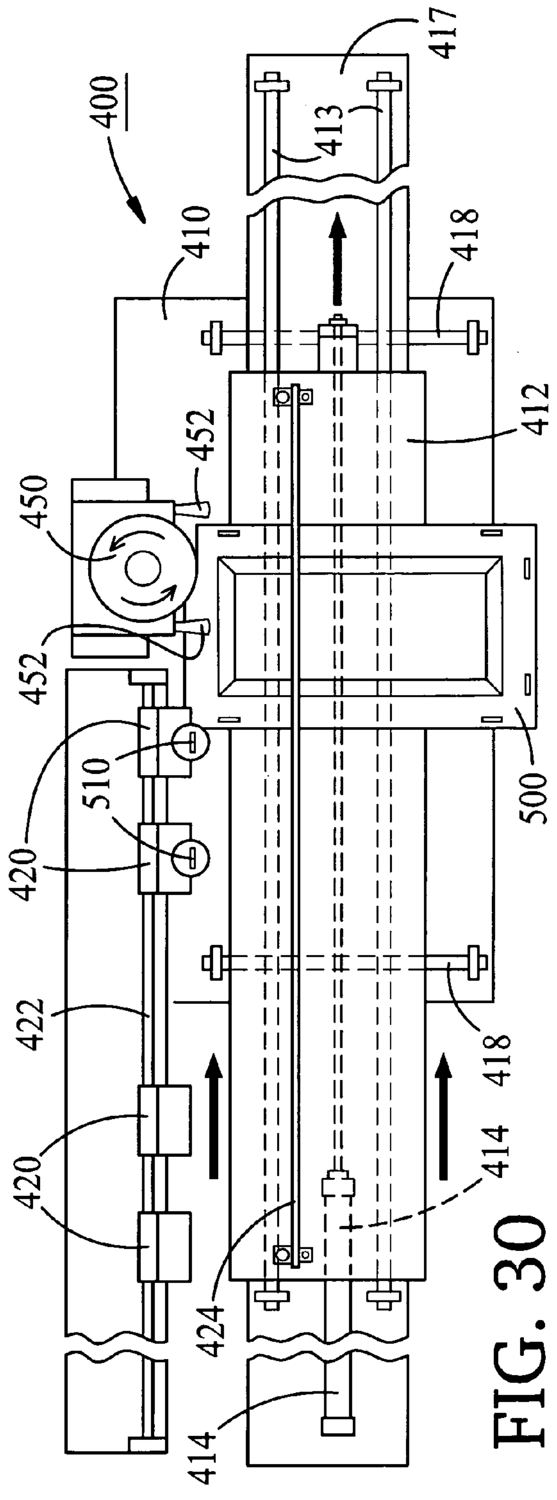
FIG. 30 is a top plan view of the trimming machine showing the workpiece being fed against the cutter head.

On FIG. 30, workpiece 500 is being fed past cutter head 450 by moving first movable table 412 moving to the right on FIG. 30 in the direction of the arrows on FIG. 30.

Figure 31:
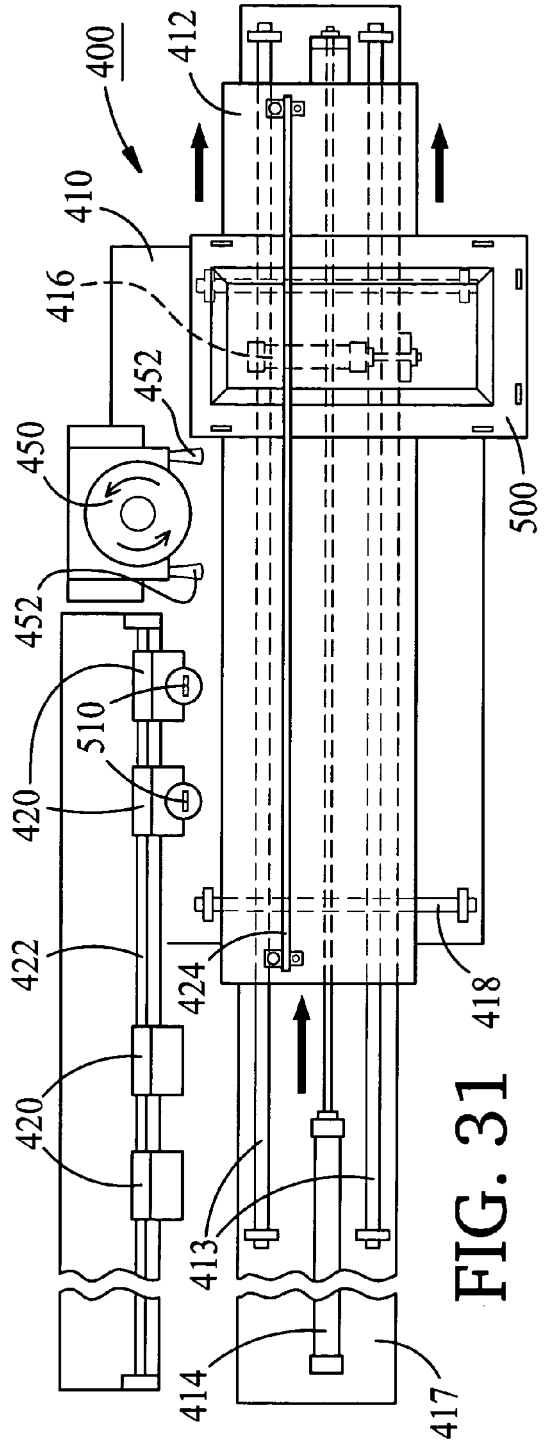
FIG. 31 is a top plan view of the trimming machine showing the workpiece moved past the cutter head.

On FIG. 31, the edge of workpiece 500 facing cutter head 500 has been fully trimmed and the rightward movement of the workpiece has been stopped.

Figure 32:
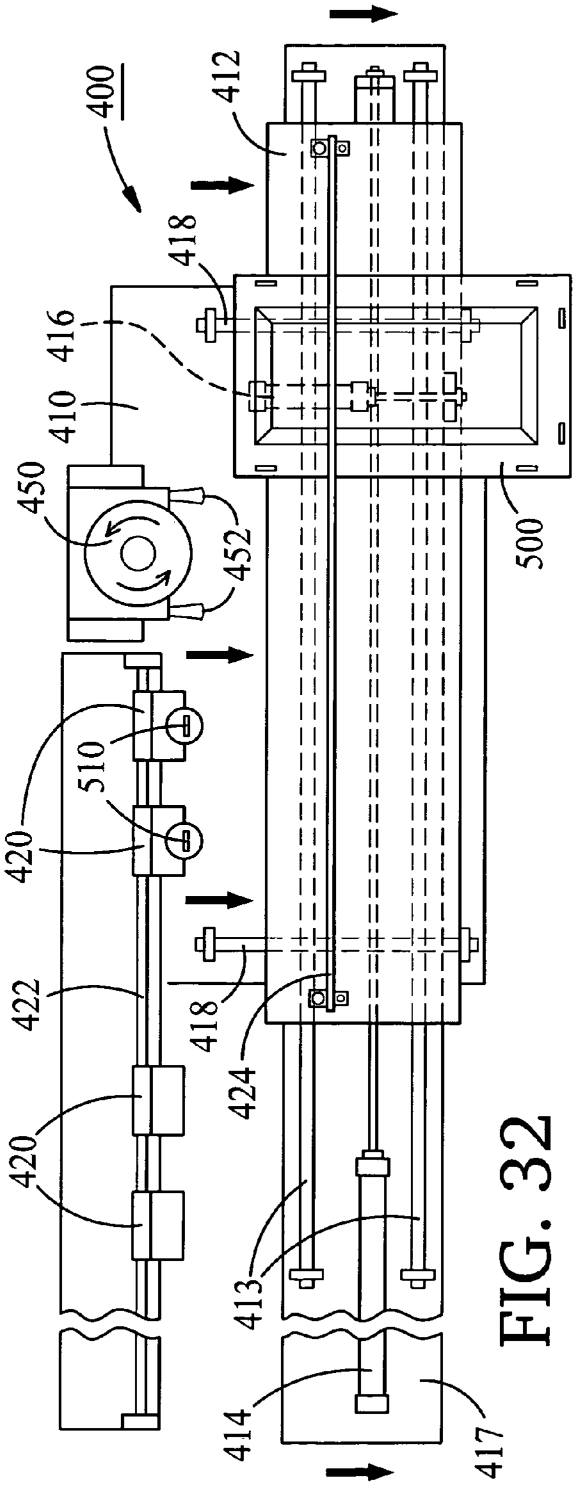
FIG. 32 is a top plan view of the trimming machine showing the moving table moved outwardly in the "Y" direction.

On FIG. 32, first movable table 412 is moved in the "Y" direction, or downwardly on FIG. 32, by virtue of second movable table 417 moving in the "Y" direction. This moves workpiece 500 outwardly of cutter head 450.

Figure 33:
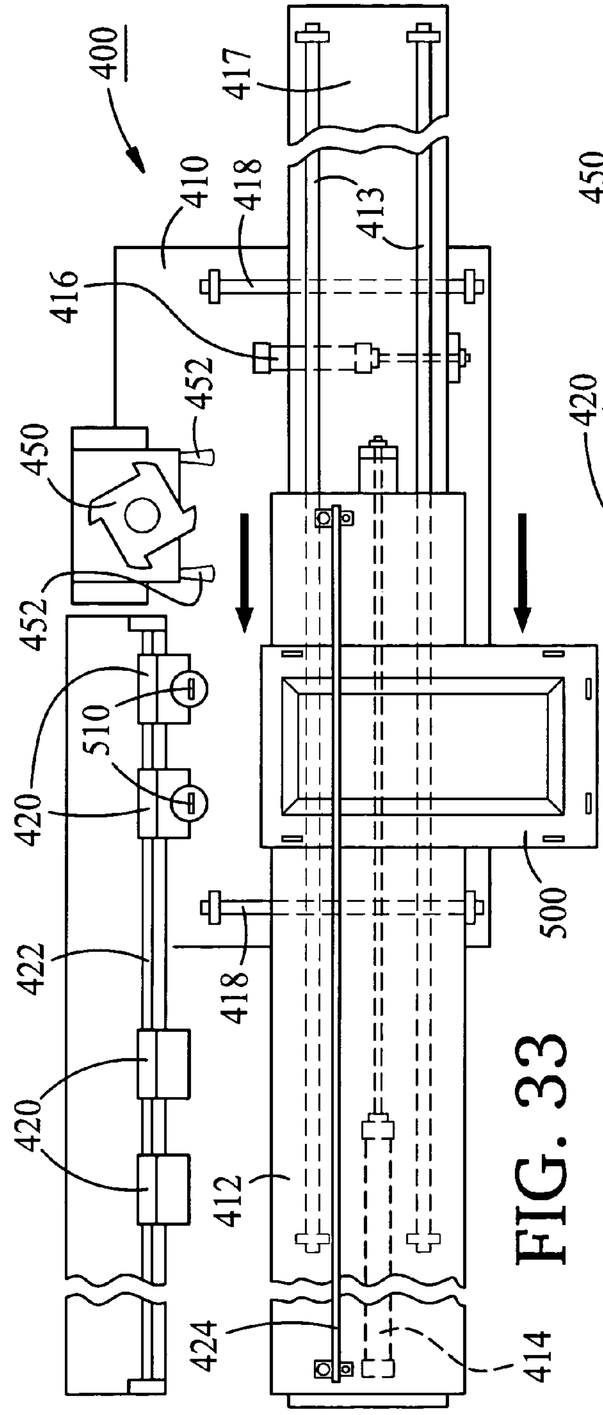
FIG. 33 is a top plan view of the trimming machine showing the moving table being returned in the "X" direction to the starting point and with the cutter head rotation stopped.

On FIG. 33, first movable table 412 is moved to the left on FIG. 33 back to its "X" starting position. First movable table 412 is then moved in the "Y" direction to the starting position shown on FIG. 27, that is, upwardly on FIG. 33.

Figure 34:
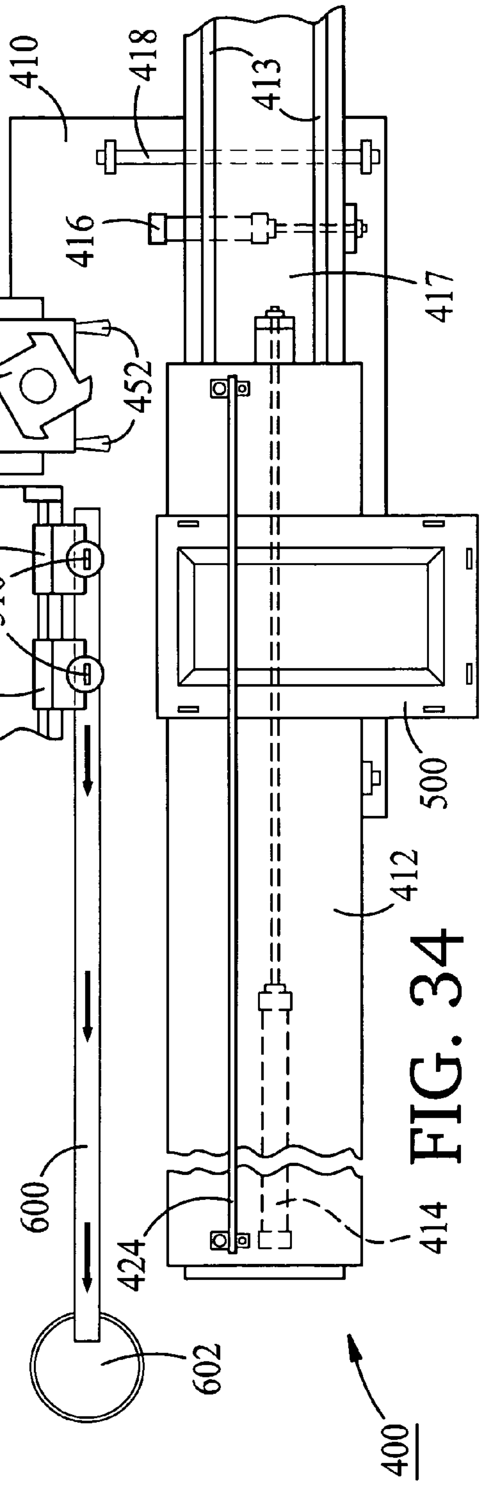
FIG. 34 is a top plan view of the trimming machine showing that the scribe pins will be released by the electromagnetic scribe pin removal assemblies and travel down a sloped channel to a collection bin.

On the final step, indicating on FIG. 34, scribe pins 510 have been released by the upper portions 520 (FIG. 25) and the scribe pins travel down channel 600 to scribe pin bin 602.

The foregoing process is repeated for the other three sides.

Figure 35:
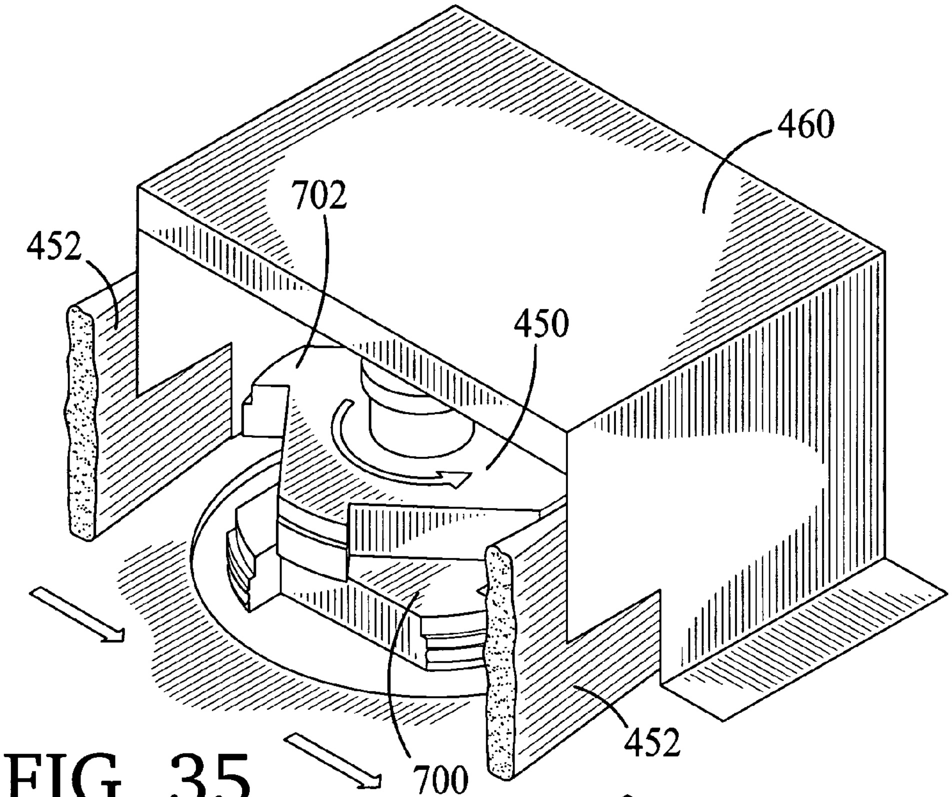
FIGS. 35 and 36 are isometric views of the cutter head showing that the cutter head is movable upwardly or downwardly to present different cutter blades to the workpiece.

FIG. 35 illustrates cutter head 450 raised so that cutter blade 700 is used to trim workpiece 500 (FIG. 21) as that workpiece passes the cutter blade as indicated by the arrows on FIG. 35.

Figure 36:
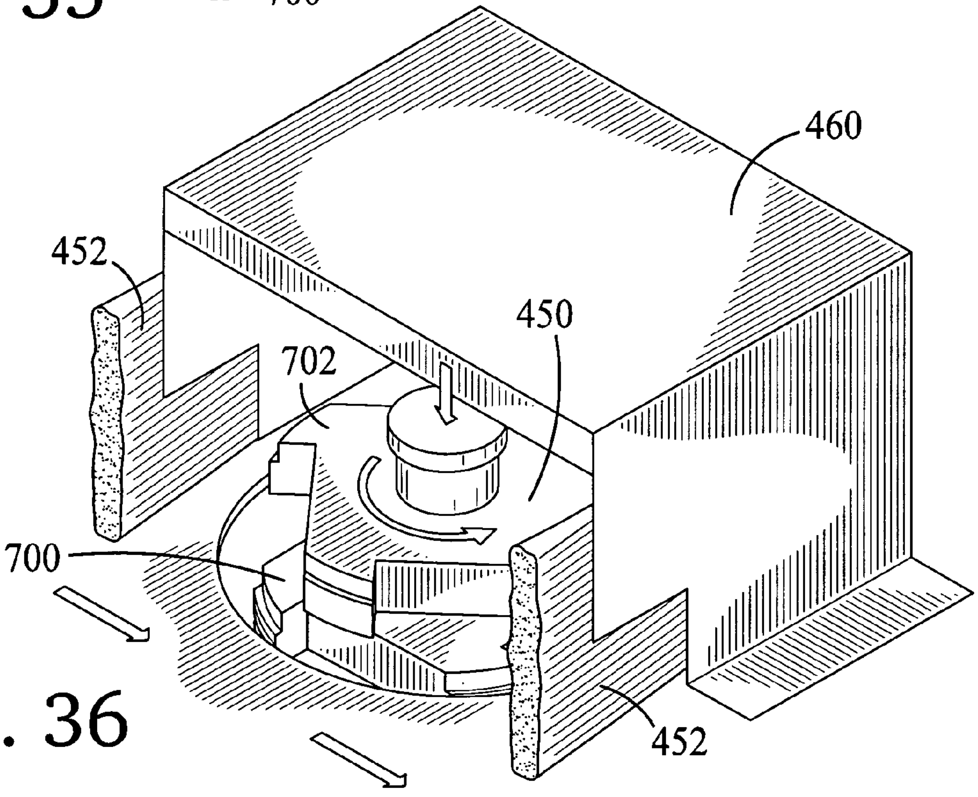
Figure 37A:
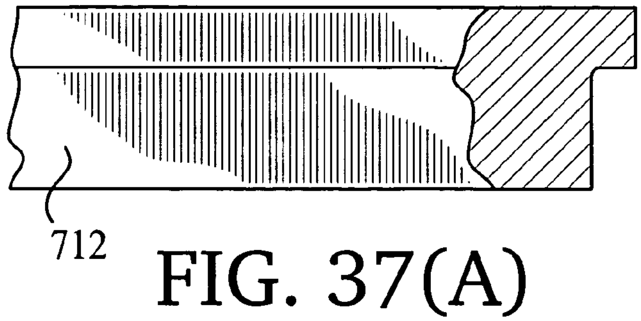
FIG. 37(A) is a fragmentary, side elevational view, partially in cross-section, of one style of cut produced by one type of cutter head.
Figure 37B:
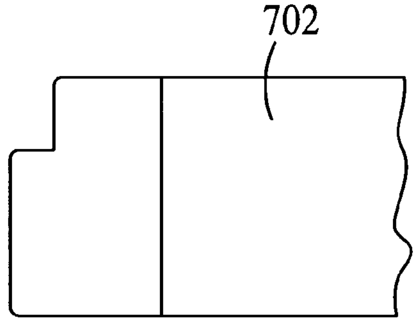
FIG. 37(B) is a fragmentary, side elevational view of the one type of cutter head.
Figure 38A:
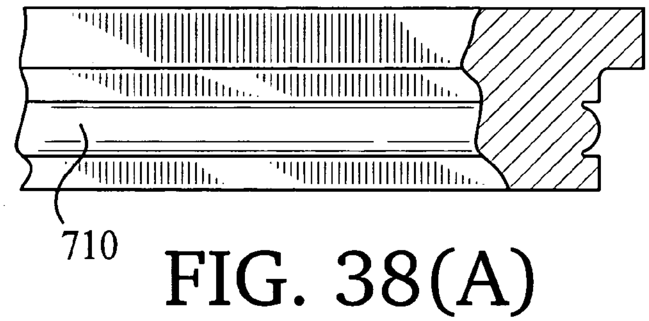
FIG. 38(A) is a fragmentary, side elevational view, partially in cross-section, of another style of cut produced by another type of cutter head.
Figure 38B:
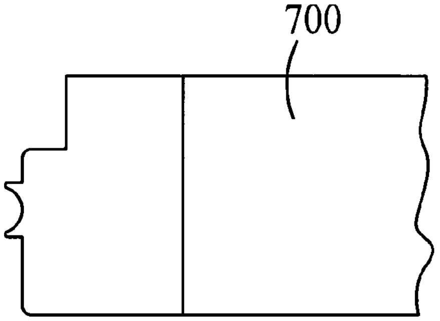
FIG. 38(B) is a fragmentary, side elevational view of the another cutter head.
Figure 39:
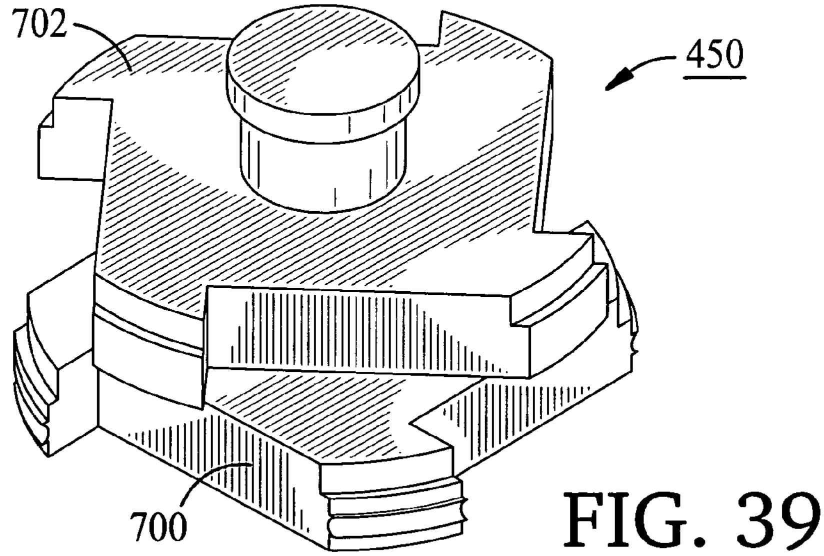
FIG. 39 is an isometric view of the assembled cutter head.

FIG. 36 illustrates cutter head 450 lowered so that cutter blade 702 is used to trim workpiece 500 (FIG. 21) as that workpiece passes the cutter blade as indicated by the arrows on FIG. 36.

FIGS. 37(A), 37(B), 38(A), and 38(B) show various cuts that can be produced by cutter head 450 (FIG. 19). Cutter blade 700 produces cut 710, while cutter blade 702 produces cut 712. Of course, other configurations can be provided as well and such is within the contemplation of the present invention.

Figure 40A:
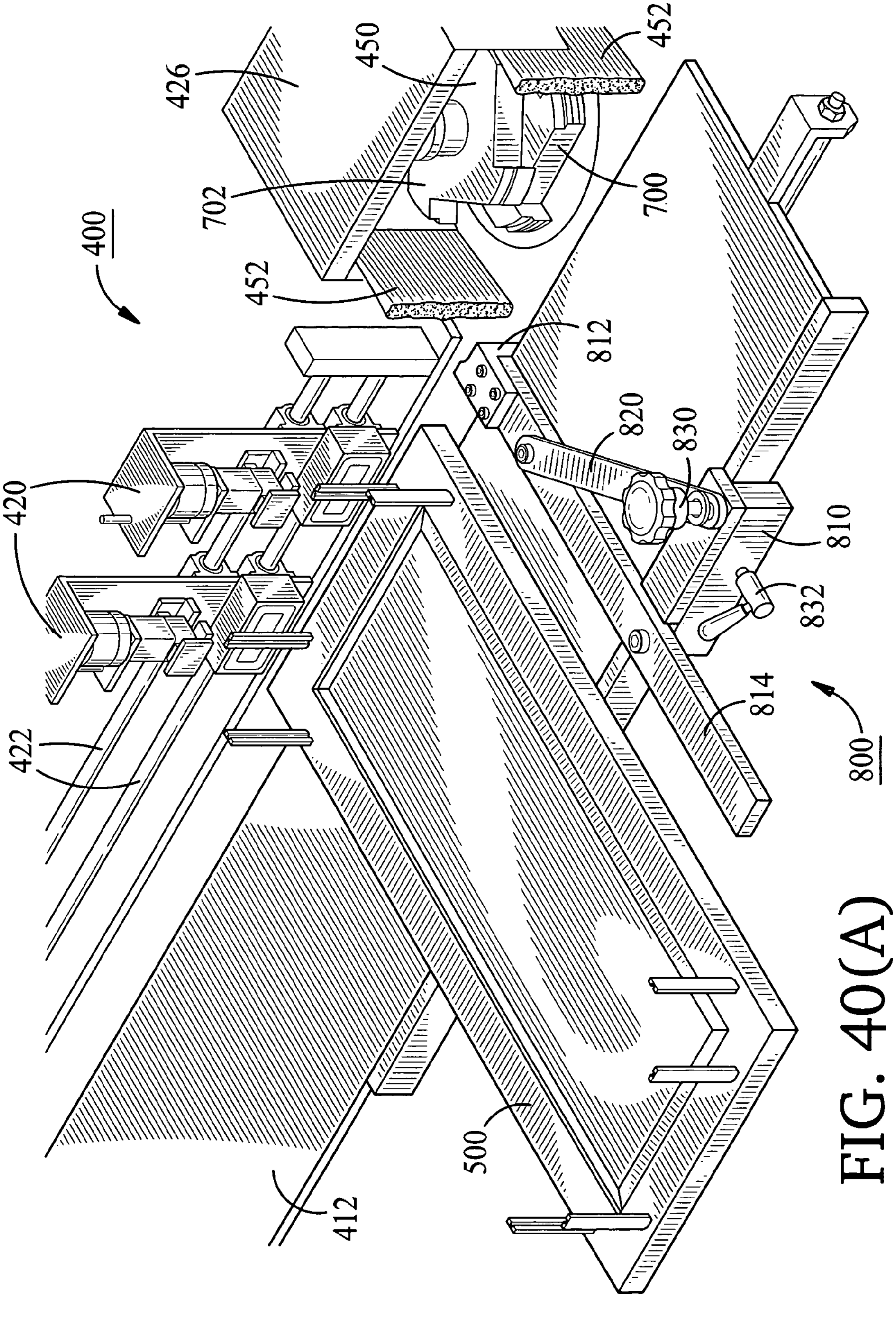
FIG. 40(A) is a fragmentary, isometric view of the trimming machine showing a clamp mechanism that may be used with elongated workpiece, the clamp mechanism being shown spaced apart from a workpiece.

FIG. 40(A) illustrates a fixture, generally indicated by the reference numeral 800 that is particularly useful when workpiece 500 is elongated, the fixture being shown spaced part from the workpiece. For clarity, vertical clamping member 424 (FIG. 18) is omitted from FIG. 40(A). Fixture includes first and second edge engaging members 810 and 812 that loosely engage the front and rear of movable table 412 and a long member 814 that fits generally along the longest portion of workpiece 500. A diagonal member 820 is rotatably attached to long member 814 and to first edge engaging member 810. A first knob and screw 830 disposed through diagonal member 820 and threadingly into first edge engaging member 810 is used to tighten diagonal member to first edge engaging member 810, while a second knob and screw 832 threadingly inserted into first edge engaging member 810 and bearing against the front edge of movable table 412 is used to tighten fixture 800 against the front and rear edges of movable table 412.

Figure 40B:
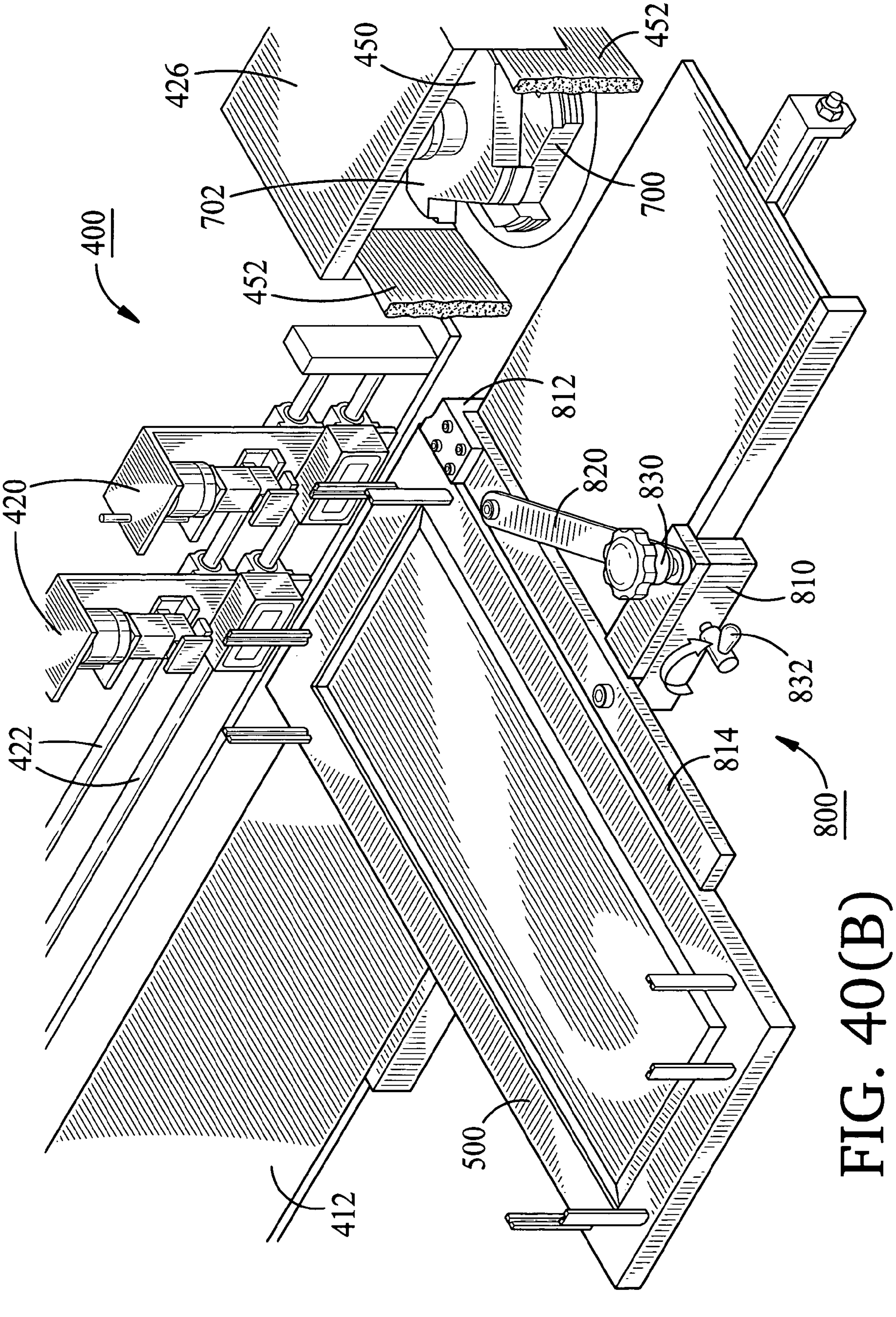
FIG. 40(B) is a fragmentary, isometric view of the trimming machine with the clamp mechanism locked in place against a workpiece.

FIG. 40(B) shows fixture 800 in tightened position against workpiece 500. Again, for clarity, vertical clamping member 424 (FIG. 18) is omitted from FIG. 40(B). Fixture 800 serves three purposes. First, fixture 800 fixedly maintains workpiece in place. Second fixture 800 maintains any slight angle that may exist between workpiece 500 and cabinet front frame 100 FIG. 1). Third, second edge engaging member 812 is formed of nylon to help prevent splitting of the edge of workpiece 500. The edge of second edge engaging member facing cutter head 450 is shaped the same as the cutter blade being used. Having second edge engaging member 812 formed of nylon is useful with a workpiece of any relative dimensions.

Figure 41:
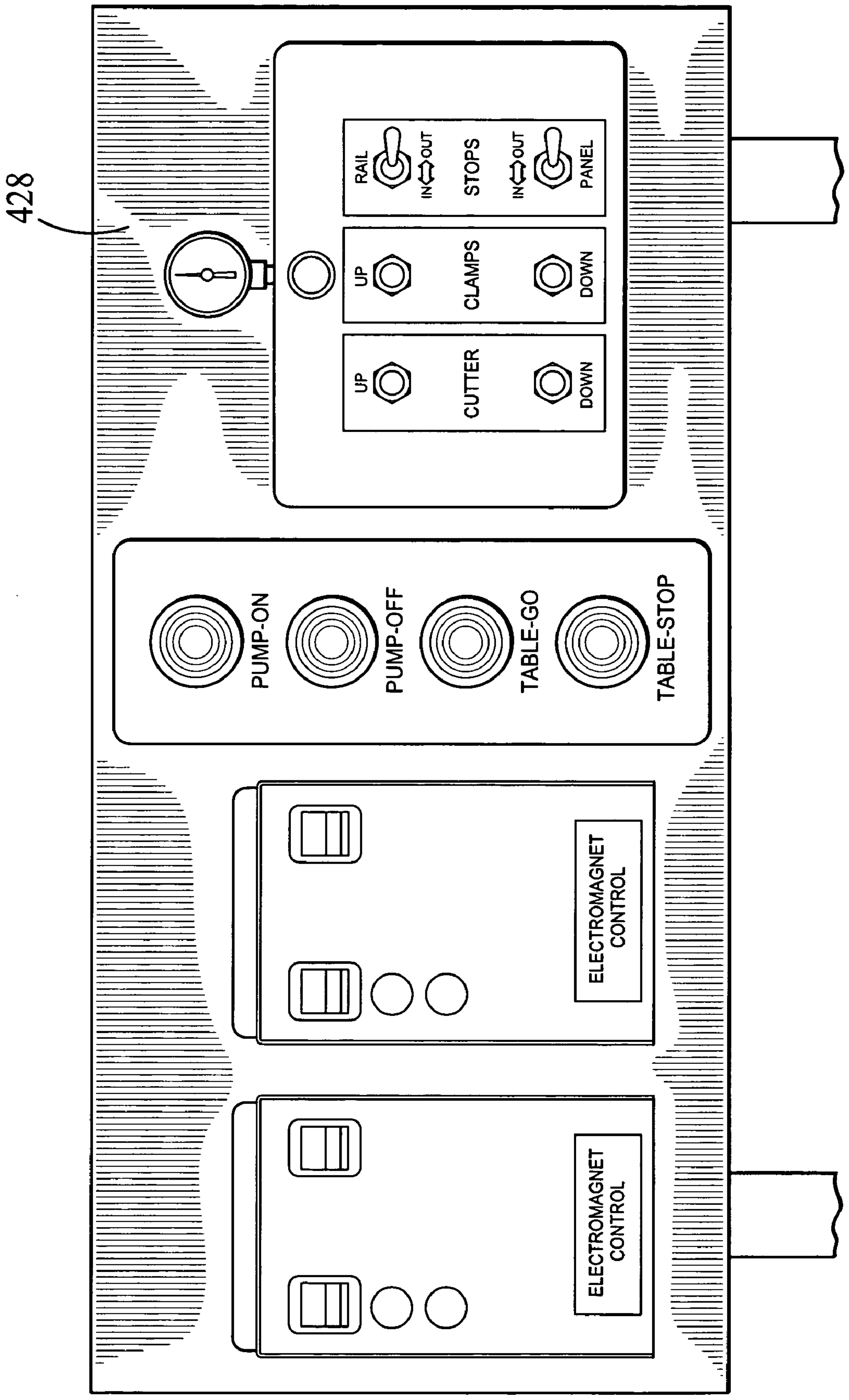
FIG. 41 is a front elevational view of the control panel of the trimming machine.

FIG. 41 illustrates control panel 428. Since the controls are conventional and others can be substituted for the same, no detailed description is provided. Once workpiece 500 is positioned as shown on FIG. 28 and vertical clamping member 424 lowered, the operation proceeds automatically until moving table is brought back to its initial position shown on FIG. 28.

In the embodiments of the present invention described above, it will be recognized that individual elements and/or features thereof are not necessarily limited to a particular embodiment but, where applicable, are interchangeable and can be used in any selected embodiment even though such may not be specifically shown.

Spatially orienting terms such as "above", "below", "upper", "lower", "inner", "outer", "inwardly", "outwardly", "vertical", "horizontal", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

What is claimed is:

1. A machine for milling doors and/or drawer fronts, comprising:

(a) means to horizontally clamp a door or drawer front to a horizontal movable table;

(b) means to remove vertically disposed scribe pins from said door and/or drawer front, backs of said vertically disposed scribe pins defining a position of a frame to be spaced from said door and/or drawer front by a reveal;

(c) points disposed at the lower end of said vertically disposed scribe pins, flush with said backs, said points inserted into said door or drawer front; and (d) means to move said movable table such as to move said door or drawer front past a cutter head, said cutter head cutting said door or drawer front at least from a line in which lie said backs to a finished edge of said door or drawer front.

2. A machine for milling doors and/or drawer fronts, as defined in claim 1, wherein: said means to remove permits alignment of said door and/or drawer front on said movable table.

3. A machine for milling doors and/or drawer fronts, as defined in claim 2, wherein: said means to remove comprises at least two vertical electromagnetic surfaces.

4. A machine for milling doors and/or drawer fronts, as defined in claim 1, further comprising:

(a) means to horizontally clamp said frame on said door and/or drawer front on a non-movable table, with said frame at said position; and (b) means to insert said points in said door and/or said drawer front at said position.

5. A machine for milling doors and/or drawer fronts, as defined in claim 4, wherein: said means to insert includes a clamp disposed against said frame, with vertical members of said clamp fitting against an inside of said frame and said clamp including a vertical surface against which one of said scribe pins may be placed to drive a point of said one of said scribe pins into said door and/or drawer front at said position.

6. A method of using a machine for milling doors and/or drawer fronts, comprising:

(a) horizontally clamping a door or drawer front to a horizontal movable table;

(b) removing vertically disposed scribe pins from said door and/or drawer front, backs of said vertically disposed scribe pins defining a position of a frame to be spaced from said door and/or drawer front by a reveal;

(c) providing points disposed at the lower end of said vertically disposed scribe pins, flush with said backs, said points inserted into said door or drawer front; and (d) moving said movable table such as to move said door or drawer front past a cutter head, said cutter head cutting said door or drawer front at least from a line in which lie said backs to a finished edge of said door or drawer front.

7. A method of using a machine for milling doors and/or drawer fronts, as defined in claim 6, further comprising: prior to removal of said scribe pins, using means to remove said scribe pins to align said door and/or drawer front on said movable table.

8. A method of using a machine for milling doors and/or drawer fronts, as defined in claim 7, further comprising: providing said means to remove as at least two vertical electromagnetic surfaces.

9. A method of using a machine for milling doors and/or drawer fronts, as defined in claim 6, further comprising:

(a) horizontally clamping said frame on said door and/or drawer front on a non-movable table, with said frame at said position; and (b) inserting said points in said door and/or said drawer front at said position.

10. A method of using a machine for milling doors and/or drawer fronts, as defined in claim 9, further comprising: providing a clamp disposed against said frame, with vertical members of said clamp fitting against an inside of said frame and said clamp including a vertical surface against which one of said scribe pins may be placed to drive a point of said one of said scribe pins into said door and/or drawer front at said position.

* * * * *